(12) United States Patent
Russell et al.

(10) Patent No.: US 7,137,624 B2
(45) Date of Patent: Nov. 21, 2006

(54) FLUID-ELASTOMERIC DAMPER ASSEMBLY INCLUDING INTERNAL PUMPING MECHANISM

(75) Inventors: Donald Russell, Fairview, PA (US); Peter Jones, Erie, PA (US); Eric Seitter, Erie, PA (US)

(73) Assignee: Lord Corporation, Cary, NC (US)

( * ) Notice: Subject to any disclaimer, the term of this patent is extended or adjusted under 35 U.S.C. 154(b) by 0 days.

(21) Appl. No.: 10/703,068

(22) Filed: Nov. 6, 2003

(65) Prior Publication Data

US 2004/0145102 A1    Jul. 29, 2004

Related U.S. Application Data

(63) Continuation-in-part of application No. 10/288,868, filed on Nov. 6, 2002, now Pat. No. 6,758,466.

(51) Int. Cl.
*F16F 7/00* (2006.01)

(52) U.S. Cl. .................. 267/141.1; 267/218; 267/294; 267/64.17; 267/140.12

(58) Field of Classification Search ............... 188/378; 267/219, 195, 217, 218, 218 X, 292, 293, 267/294, 64.11, 64.17, 64.17 X, 140.11, 267/140.12, 140.12 X, 140.13, 140.4, 141.1
See application file for complete search history.

(56) References Cited

U.S. PATENT DOCUMENTS

| | | | |
|---|---|---|---|
| 2,919,883 A | 1/1960 | Murphy | |
| 3,046,003 A | 7/1962 | Schultz | |
| 4,203,708 A | 5/1980 | Rybicki | |
| 4,236,607 A * | 12/1980 | Halwes et al. | ............... 188/379 |
| 4,342,446 A | 8/1982 | Eaton et al. | |
| 4,580,945 A | 4/1986 | Miller | |
| 4,778,343 A | 10/1988 | Hahn et al. | |
| 4,811,919 A | 3/1989 | Jones | |
| 5,092,738 A | 3/1992 | Byrnes et al. | |
| 5,174,552 A * | 12/1992 | Hodgson et al. | ....... 267/140.11 |
| 5,219,430 A | 6/1993 | Antoine | |
| 5,266,005 A * | 11/1993 | Aubry | ........................ 416/106 |
| 5,312,093 A | 5/1994 | Smith et al. | |
| 5,374,039 A * | 12/1994 | Schmidt et al. | ........ 267/140.13 |
| 5,407,325 A * | 4/1995 | Aubry | ........................ 416/106 |
| 5,413,320 A * | 5/1995 | Herbst | .................... 267/140.13 |
| 5,423,523 A | 6/1995 | Gossman et al. | |
| 5,540,549 A * | 7/1996 | McGuire | ..................... 416/140 |
| 5,762,295 A * | 6/1998 | McGuire et al. | .............. 244/54 |

(Continued)

FOREIGN PATENT DOCUMENTS

EP    0537927    4/1993

(Continued)

*Primary Examiner*—Devon Kramer
(74) *Attorney, Agent, or Firm*—Edward F. Murphy, III

(57) ABSTRACT

A fluid-elastomeric damper assembly operable for damping relative motion between a first structure and a second structure including a housing structure grounded to the first structure and a plurality of elastomer seals coupled to the housing structure, the housing structure and the plurality of elastomer seals defining a fluid-elastomeric chamber operable for containing a fluid. The fluid-elastomeric damper assembly also including one or more piston structures disposed within the housing structure and the fluid-elastomeric chamber, the one or more piston structures grounded to the first structure and driven by the second structure, and the one or more piston structures each including a first substantially fluid-filled chamber and a second substantially-fluid-filled chamber in communication via an orifice, the first substantially fluid-filled chamber and the second substantially fluid-filled chamber also in communication with the fluid-elastomeric chamber. The housing structure is operable for pumping the fluid through the orifice.

19 Claims, 23 Drawing Sheets

U.S. PATENT DOCUMENTS

| | | | | |
|---|---|---|---|---|
| 5,957,440 A | * | 9/1999 | Jones et al. | 267/140.14 |
| 6,032,936 A | | 3/2000 | Redinger | |
| 6,045,328 A | * | 4/2000 | Jones | 416/140 |
| 6,056,279 A | * | 5/2000 | Lee et al. | 267/140.13 |
| 6,092,795 A | | 7/2000 | McGuire | |
| 6,200,097 B1 | | 3/2001 | Mouille | |
| 6,378,852 B1 | * | 4/2002 | Ticks et al. | 267/140.14 |
| 6,394,432 B1 | * | 5/2002 | Whiteford | 267/140.13 |
| 2002/0060268 A1 | * | 5/2002 | Smith et al. | 244/54 |
| 2002/0128072 A1 | | 9/2002 | Terpay et al. | |

FOREIGN PATENT DOCUMENTS

| | | |
|---|---|---|
| EP | 0629791 | 12/1994 |
| GB | 796023 | 6/1958 |

* cited by examiner

FLUID-ELASTOMERIC DAMPER ASSEMBLY INCLUDING INTERNAL PUMPING MECHANISM

This Application is a Continuation-in-Part (CIP) of U.S. patent application Ser. No. 10/288,868 filed Nov. 6, 2002, now U.S. Pat. No. 6,758,466 the priority to which is hereby claimed, and is hereby incorporated by reference.

FIELD OF THE INVENTION

The present invention relates generally to a damper assembly used to control movement/vibration in a mechanical system or the like. More specifically, the present invention relates to a fluid-elastomeric damper assembly including an internal pumping mechanism. The fluid-elastomeric damper assembly may be used, for example, to control movement/vibration in the lead-lag direction of the rotor of a rotary-wing aircraft or the like.

BACKGROUND OF THE INVENTION

Conventional fluid-elastomeric damper assemblies (also referred to as "Fluidlastic®" damper assemblies commercially available from Lord Corporation, 111 Lord Drive, POBOX 8012, Cary, N.C. 27511) typically incorporate an elastomer seal, such as a rubber seal or the like, containing a fluid, such as hydraulic fluid or the like. This elastomer seal is bonded, fixedly attached, or otherwise coupled to the major metal components of the fluid-elastomeric damper assembly which are, in turn, fixedly attached or otherwise coupled to one or more moving/vibrating structures. These moving/vibrating structures may include, for example, the flex-beam and the pitch case of the rotor of a rotary-wing aircraft or the like. The elastomer seal is used to pump the fluid through a restriction, such as one or more orifices or the like, creating an increase in the fluid pressure which reacts against the elastomer seal surface, resulting in a damping force resisting the movement/vibration of the one or more moving/vibrating structures. The fluid may be pumped, for example, from one chamber disposed within the elastomer seal or an associated structure to another chamber disposed within the elastomer seal or an associated structure, or from one chamber formed by the major metal components of the fluid-elastomeric damper assembly to another chamber formed by the major metal components of the fluid-elastomeric damper assembly.

Advantageously, the elastomer seal is substantially leak-resistant and is capable of accommodating movement/vibration in a plurality of directions. However, in order to create a desired damping force, the volume stiffness, i.e., the elastomer stiffness reacting the fluid pressure, of the fluid-elastomeric damper assembly must be sufficiently high and the observed increase in the stiffness of the elastomer seal which results from the increased fluid pressure must be limited to within a predetermined range. This is not always possible, for example, in the control of movement/vibration in the lead-lag direction of the rotor of a rotary-wing aircraft or the like.

Thus, what is needed is a fluid-elastomeric damper assembly including one or more elastomer seals, but also including an internal pumping mechanism that does not rely on the one or more elastomer seals to pump the fluid through the restriction, i.e., through the one or more orifices. This would allow for the creation of relatively higher damping forces in relation to the elastomer stiffness for resisting relatively greater movement/vibration of the one or more moving/vibrating structures than is possible with conventional fluid-elastomeric damper assemblies. Although the assemblies, mechanisms, and methods of the present invention are described herein below in conjunction with the flex-beam and the pitch case of the rotor of a rotary-wing aircraft or the like, the assemblies, mechanisms, and methods of the present invention may be used in conjunction with any mechanical system or the like including one or more movement/vibration structures that it is desirable to damp.

BRIEF SUMMARY OF THE INVENTION

In various embodiments of the present invention, a fluid-elastomeric damper assembly includes at least a first elastomer seal, such as a rubber seal or the like, disposed at a first end of the fluid-elastomeric damper assembly and a second elastomer seal, such as a rubber seal or the like, disposed at a second end of the fluid-elastomeric damper assembly. The first elastomer seal is fixedly attached or otherwise coupled to a first moving/vibrating structure, such as a flex-beam of the rotor of a rotary-wing aircraft or the like, and the second elastomer seal is fixedly attached or otherwise coupled to a second moving/vibrating structure, such as a pitch case of the rotor of a rotary-wing aircraft or the like. The first elastomer seal and the second elastomer seal are both bonded, fixedly attached, or otherwise coupled to a housing structure including, for example, a first housing member and a second housing member. Together, the first elastomer seal, the second elastomer seal, and the housing structure are operable for containing a fluid, such as hydraulic fluid or the like. An internal pumping mechanism including one or more piston structures and a piston structure housing is also disposed within the housing structure. The internal pumping mechanism is grounded to or integrally formed with the first moving/vibrating structure and moves in relation to the housing structure and the second moving/vibrating structure to which the housing structure is grounded. The internal pumping mechanism is configured such that, when The internal pumping mechanism moves with respect to the housing structure and the second moving/vibrating structure, the fluid surrounding and disposed within the internal pumping mechanism is pumped from a first chamber disposed within each of the one or more piston structures to a second chamber disposed within each of the one or more piston structures through a restriction, i.e., an orifice. Optionally, the relative size of the restriction is controlled by an adjustable pressure relief device and/or a temperature-compensating device. Advantageously, the first elastomer seal, the second elastomer seal, and the housing structure provide a fluid-elastomeric chamber operable for containing the fluid and in which the internal pumping mechanism may be submerged. This fluid-elastomeric chamber is flexible and allows the internal pumping mechanism to damp movement/vibration in a primary direction with a relatively high damping force. Additionally, movement/vibration in a plurality of other directions are accommodated by the internal pumping mechanism by design, without damping force.

In one embodiment of the present invention, a fluid-elastomeric damper assembly includes a housing structure, a first elastomer seal coupled to the housing structure, and a second elastomer seal coupled to the housing structure. The housing structure, the first elastomer seal, and the second elastomer seal define a fluid-elastomeric chamber operable for containing a fluid. The fluid-elastomeric damper assembly also includes an internal pumping mechanism disposed within the fluid-elastomeric chamber.

In another embodiment of the present invention, a fluid-elastomeric damper assembly operable for damping relative motion between a first structure and a second structure includes a housing structure coupled the first structure, a first elastomer seal coupled to the housing structure, wherein the first elastomer seal is also coupled to the second structure, and a second elastomer seal coupled to the housing structure. Again, the housing structure, the first elastomer seal, and the second elastomer seal define a fluid-elastomeric chamber operable for containing a fluid. The fluid-elastomeric damper assembly also includes an internal pumping mechanism disposed within the fluid-elastomeric chamber, wherein the internal pumping mechanism is coupled to the second elastomer seal.

In a further embodiment of the present invention, a fluid-elastomeric damper assembly operable for damping relative motion between a first structure and a second structure includes a housing structure grounded to the first structure and a plurality of elastomer seals coupled to the housing structure, wherein the housing structure and the plurality of elastomer seals define a fluid-elastomeric chamber operable for containing a fluid. The fluid-elastomeric damper assembly also includes one or more piston structures disposed within the housing structure and the fluid-elastomeric chamber, wherein the one or more piston structures are grounded to the first structure and driven by the second structure, and wherein the one or more piston structures each include a first substantially fluid-filled chamber and a second substantially-fluid-filled chamber in communication via an orifice, the first substantially fluid-filled chamber and the second substantially fluid-filled chamber also in communication with the fluid-elastomeric chamber. The housing structure is operable for pumping the fluid through the orifice.

In a still further embodiment of the present invention, a method for damping relative motion between a first structure and a second structure includes grounding a housing structure to the first structure, coupling a plurality of elastomer seals to the housing structure, wherein the housing structure and the plurality of elastomer seals define a fluid-elastomeric chamber, and disposing a fluid within the fluid-elastomeric chamber. The method also includes disposing one or more piston structures within the housing structure and the fluid-elastomeric chamber and grounding the one or more piston structures to the first structure, wherein the one or more piston structures each include a first substantially fluid-filled chamber and a second substantially-fluid-filled chamber in communication via an orifice, the first substantially fluid-filled chamber and the second substantially fluid-filled chamber also in communication with the fluid-elastomeric chamber. Again, the housing structure is operable for pushing the fluid through the orifice. The method further comprising driving the one or more piston structures with the second structure.

It is to be understood that both the foregoing general description and the following detailed description are exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principals and operation of the invention.

DETAILED DESCRIPTION OF THE INVENTION

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

Figure 1:
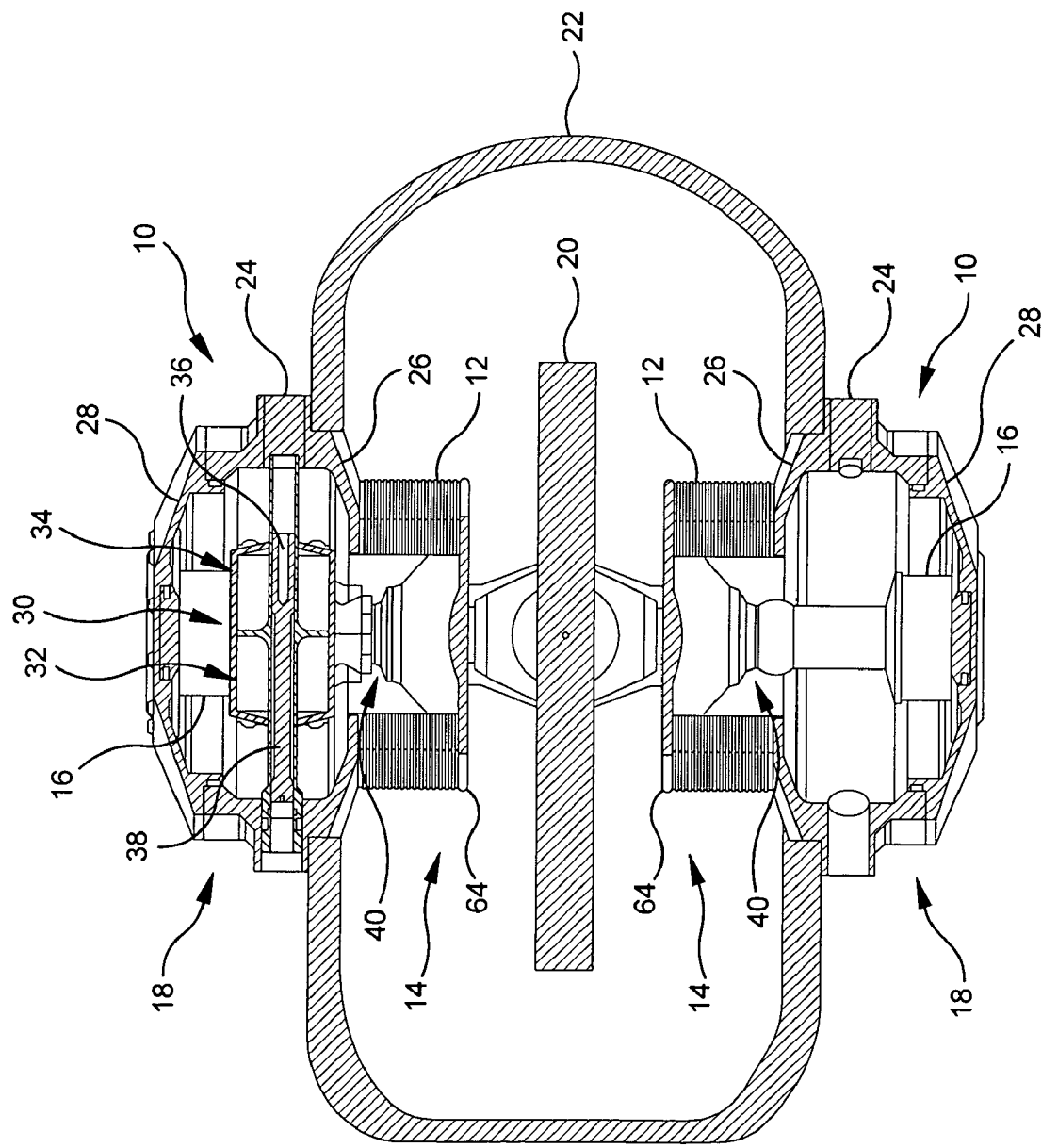
FIG. 1 is a cross-sectional side (cord-wise) view of one embodiment of the fluid-elastomeric damper assembly of the present invention, highlighting an internal plumping device disposed with a fluid-elastomeric chamber of the fluid-elastomeric damper assembly (the top portion of FIG. 1 illustrating the internal pumping device, the bottom portion of FIG. 1 illustrating the fluid-elastomeric chamber)
Figure 3:
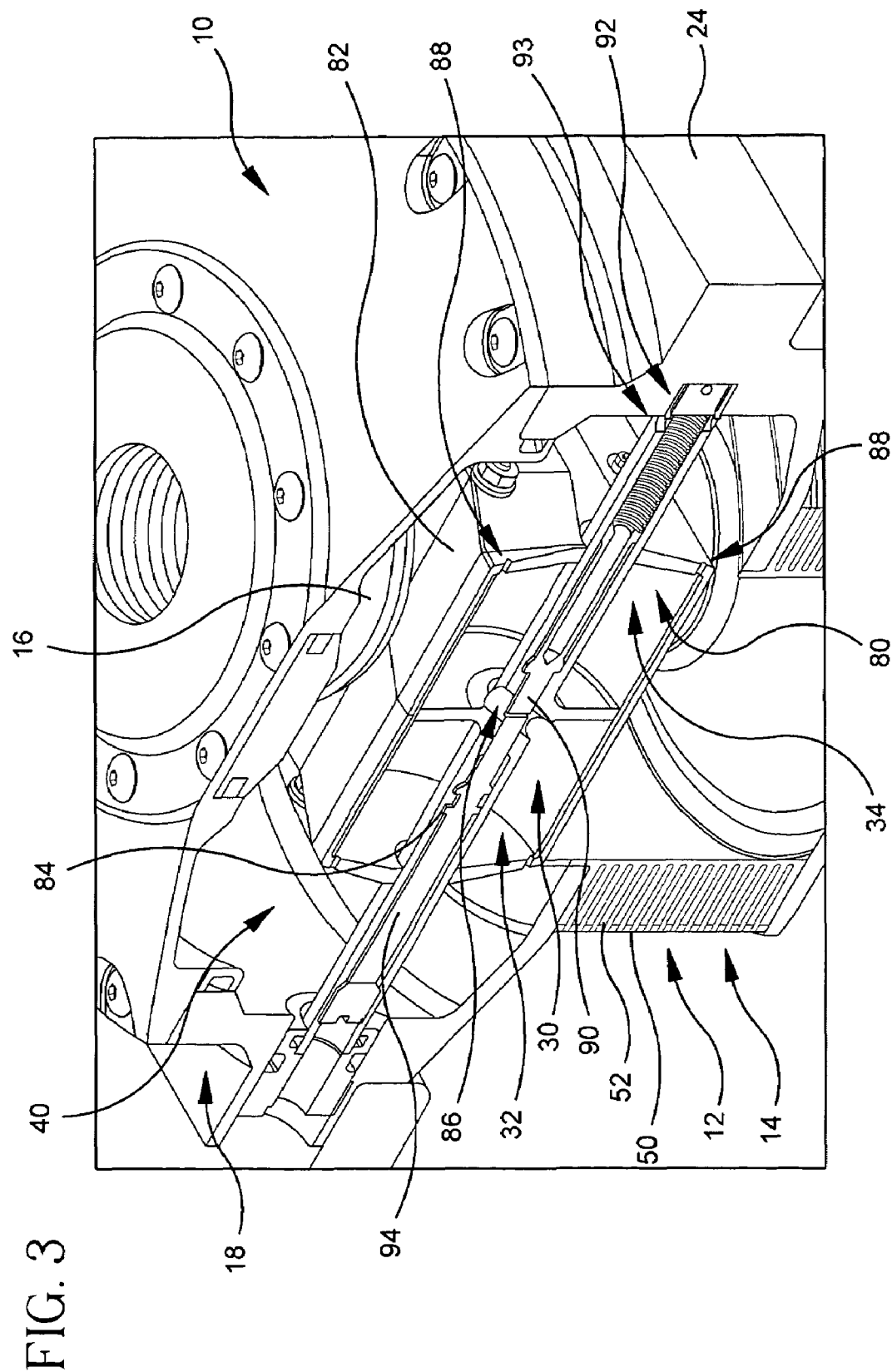
FIG. 3 is an exploded perspective view of the fluid-elastomeric damper assembly of FIGS. 1 and 2, again highlighting the internal pumping device disposed with the fluid-elastomeric chamber of the fluid-elastomeric damper assembly.
Figure 4:
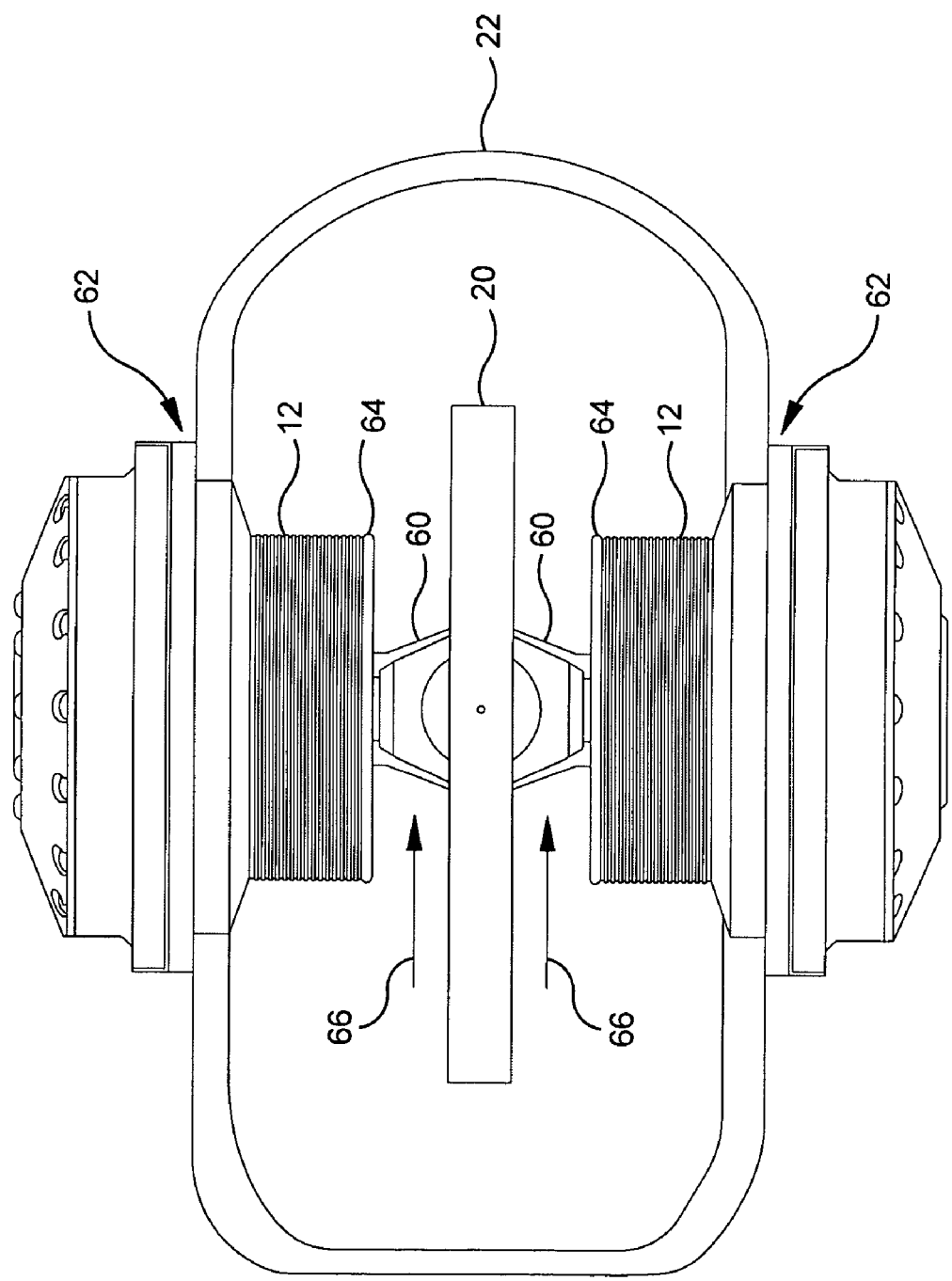
FIG. 4 is a side (cord-wise) view of the fluid-elastomeric damper assembly of FIGS. 1–3.
Figure 14A:
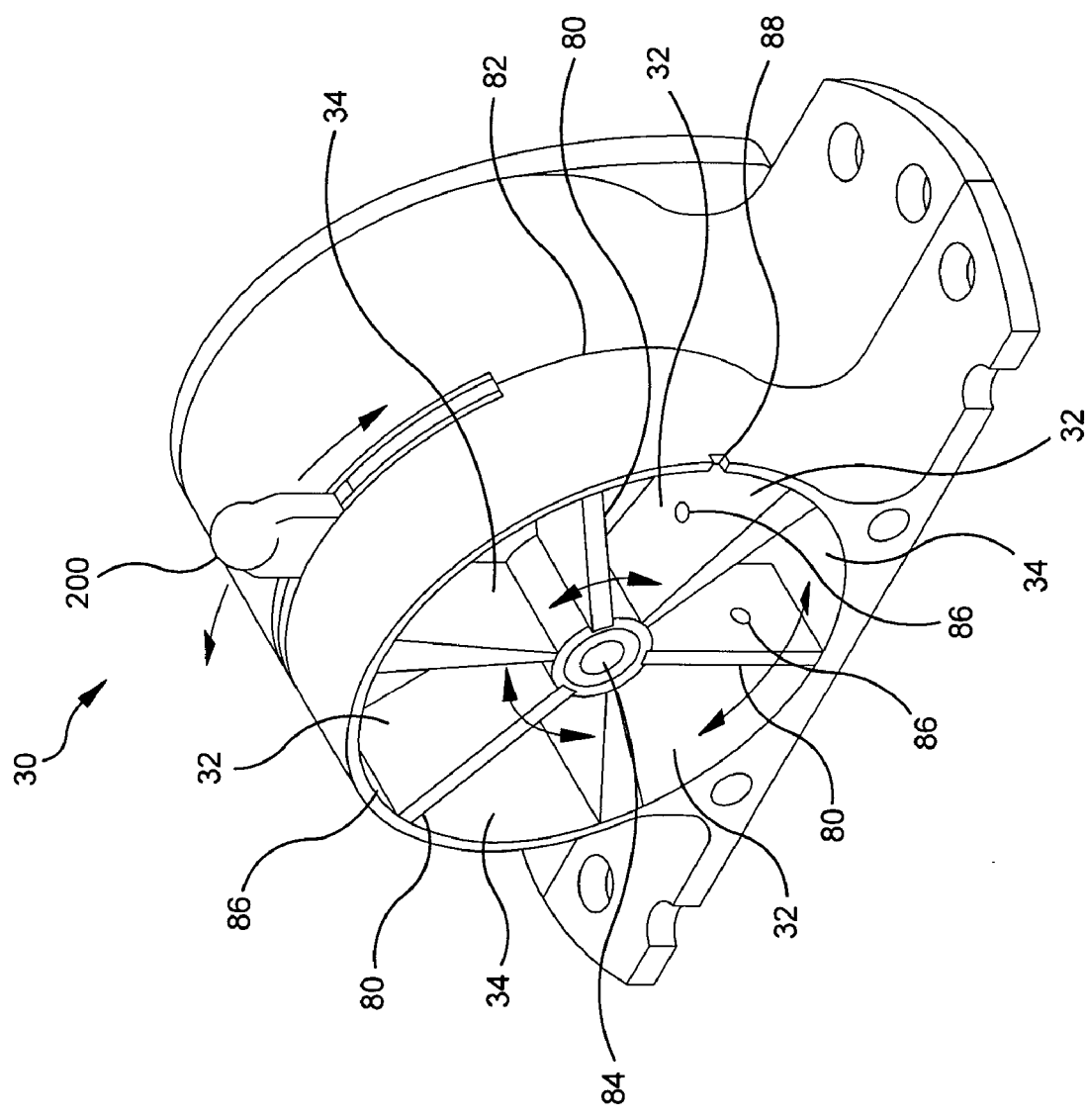
FIGS. 14A–C show embodiments of the invention.
Figure 14B:
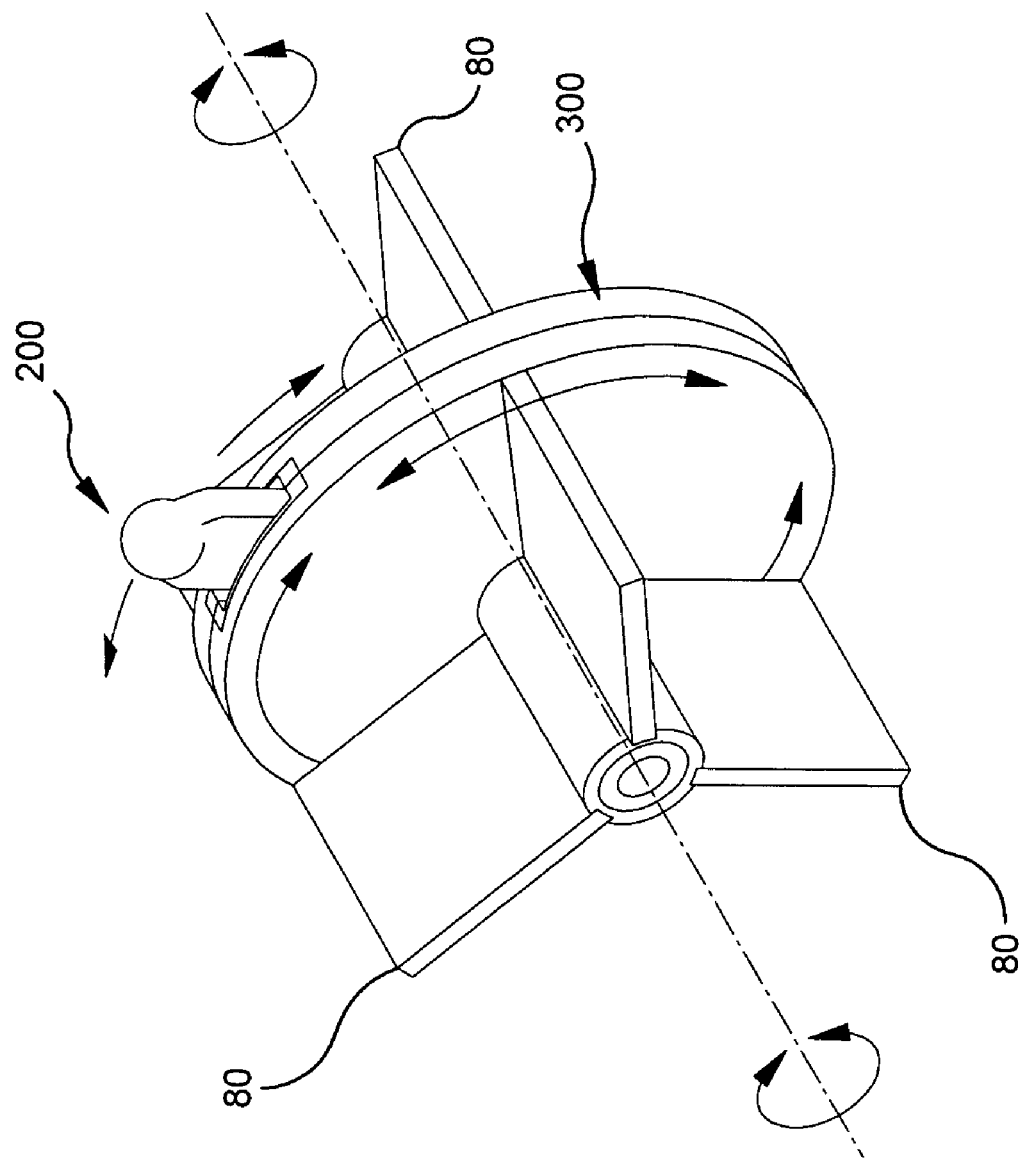
Figure 14C:
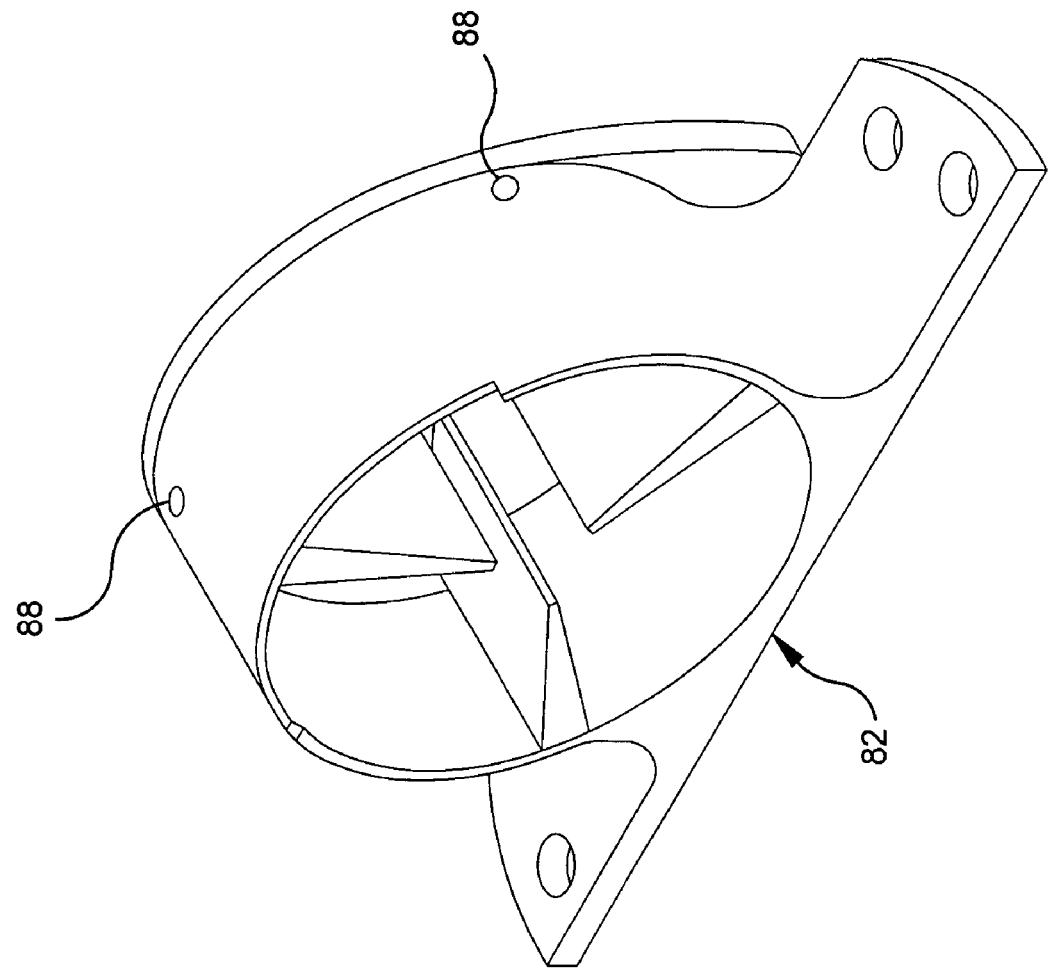
Figure 15:
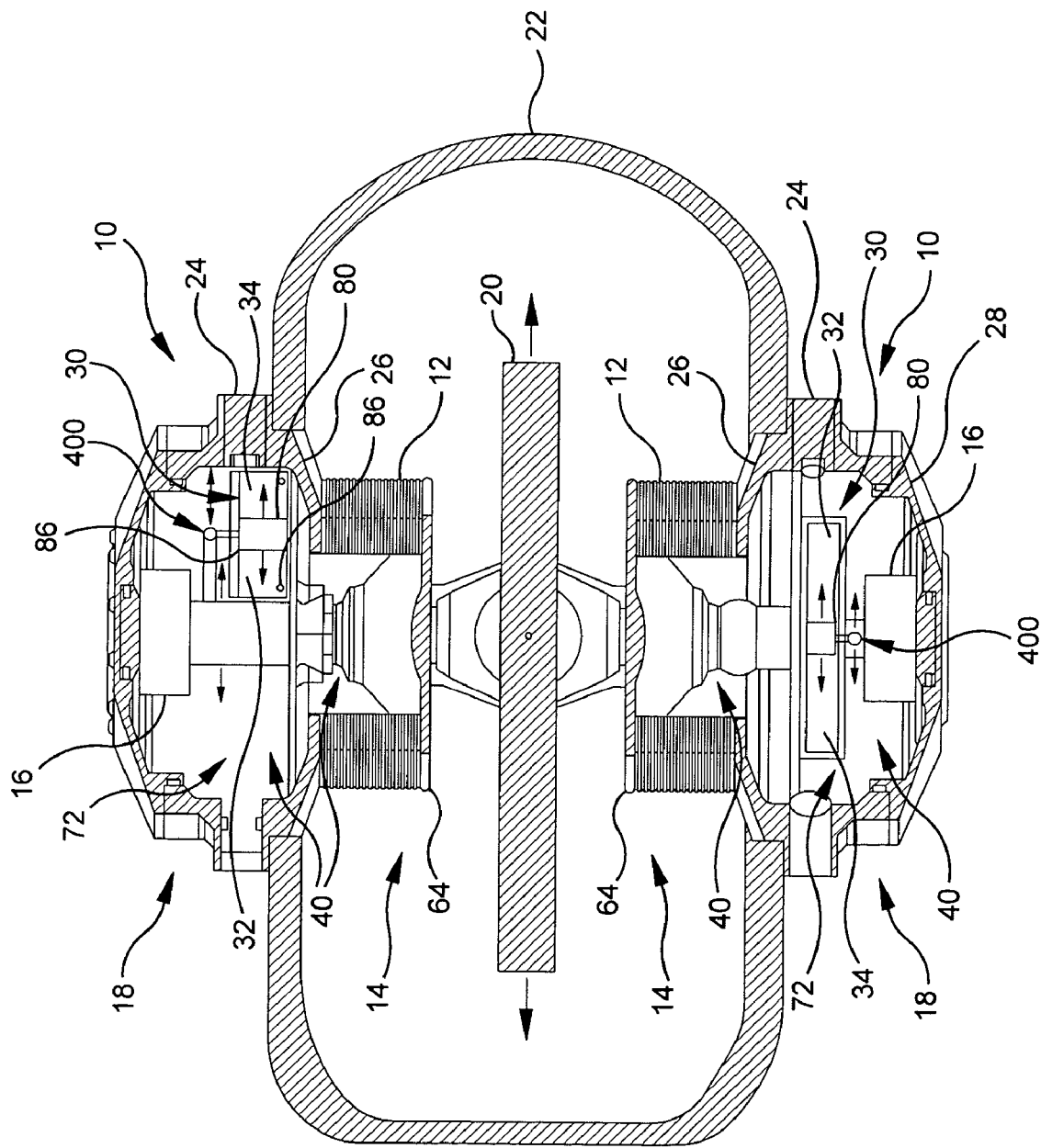
FIG. 15 shows an embodiment of the invention.
Figure 16:
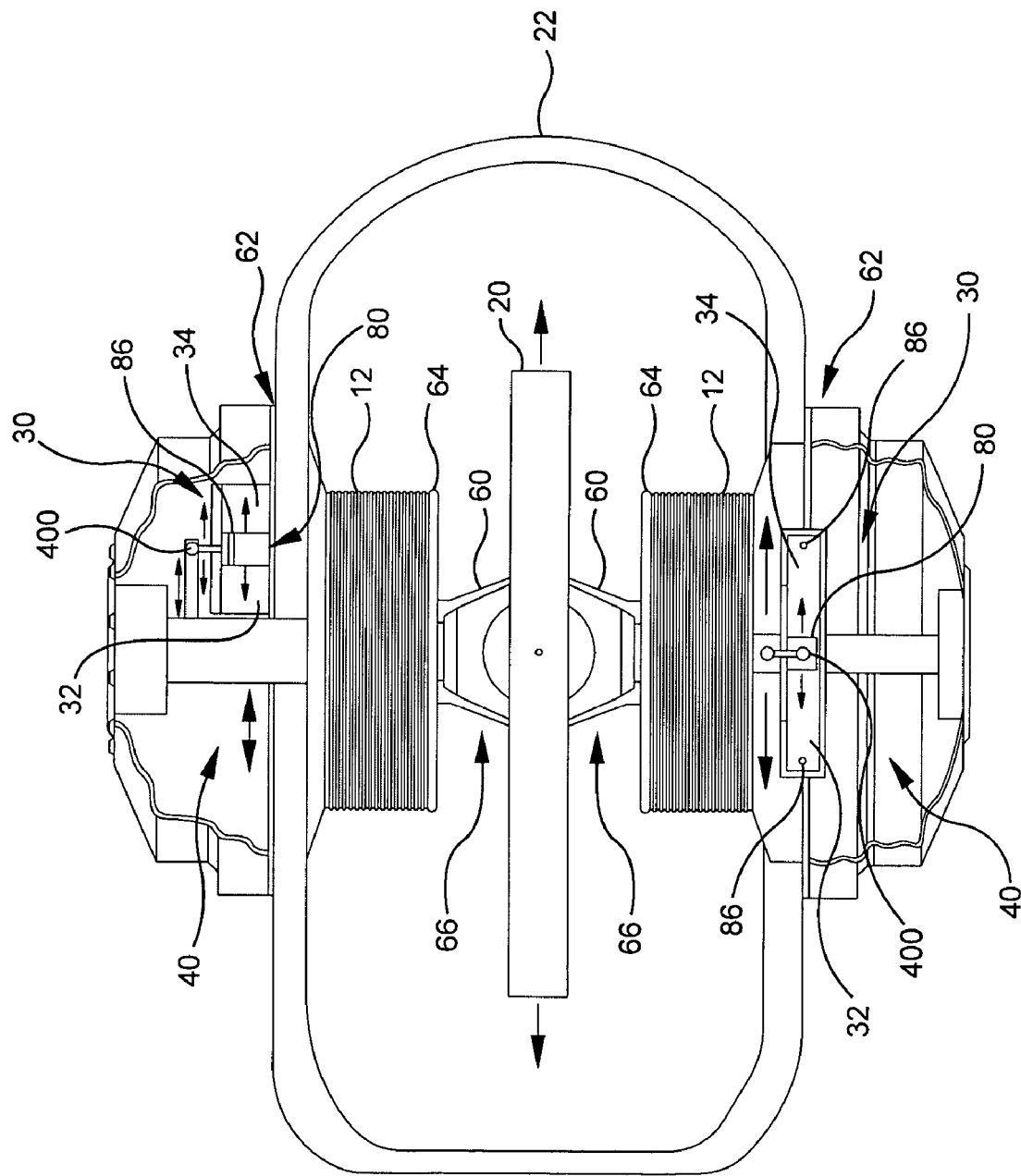
FIG. 16 shows an embodiment of the invention.
Figure 17:
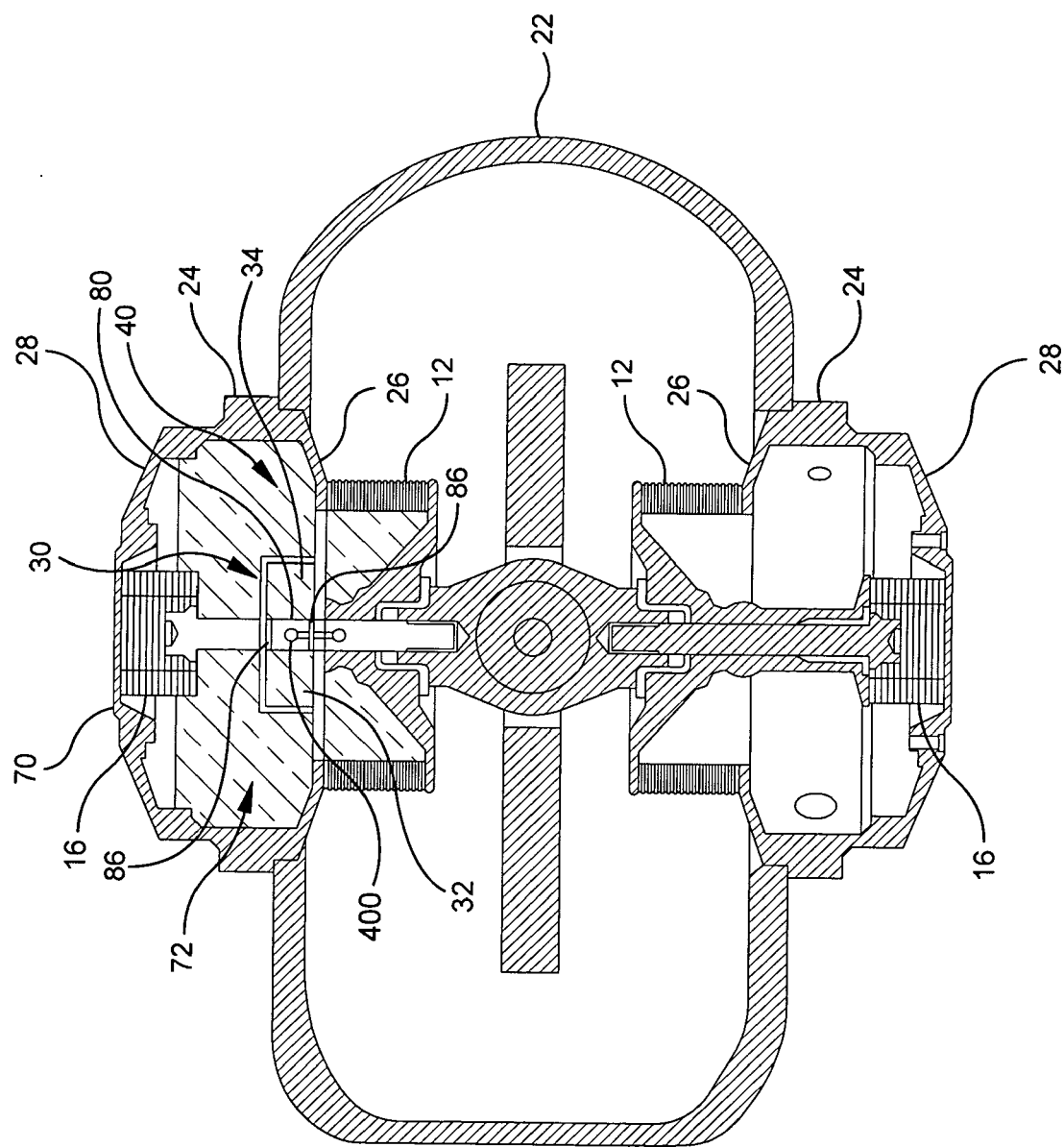
FIG. 17 shows an embodiment of the invention.
Figure 18A:
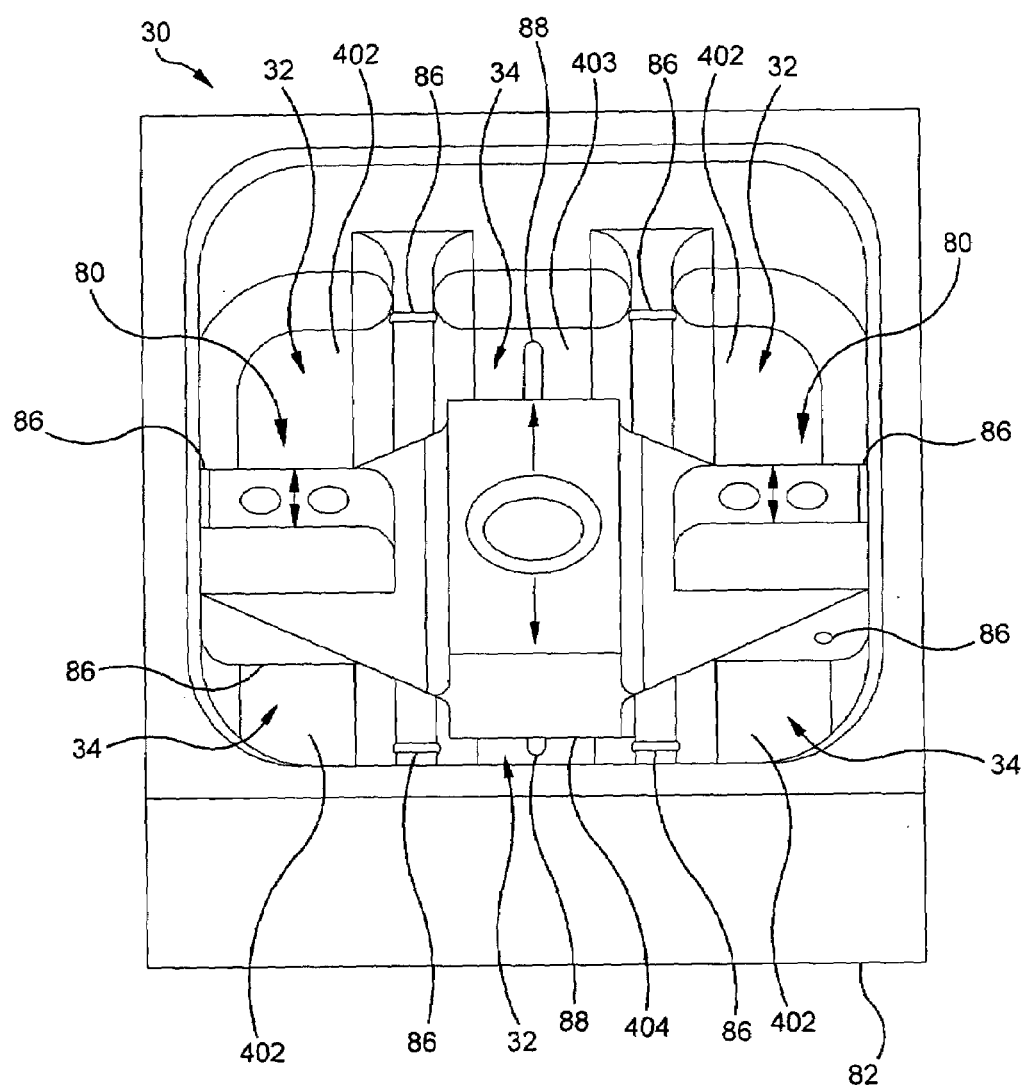
FIGS. 18A–D show embodiments of the invention.
Figure 18B:
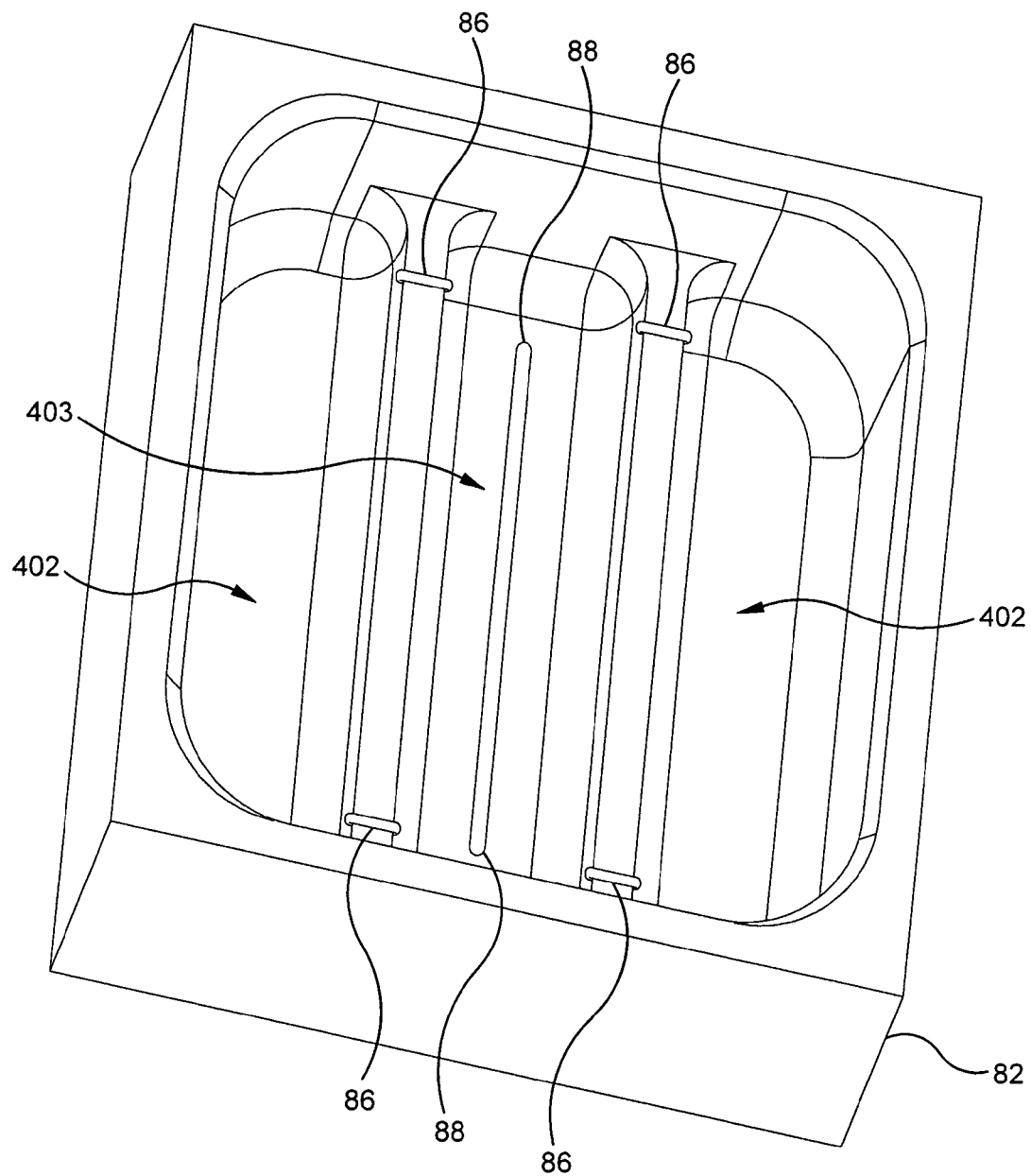
Figure 18C:
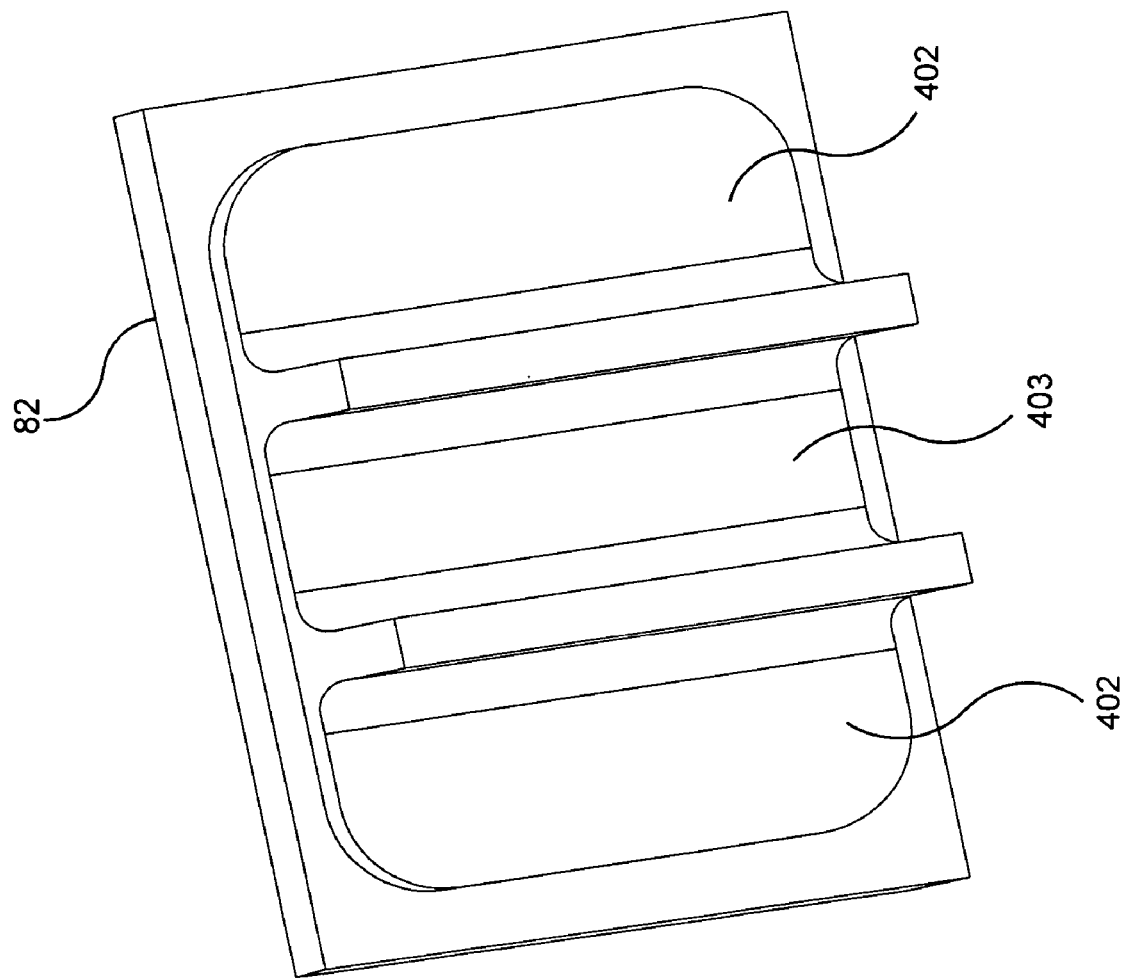
Figure 18D:
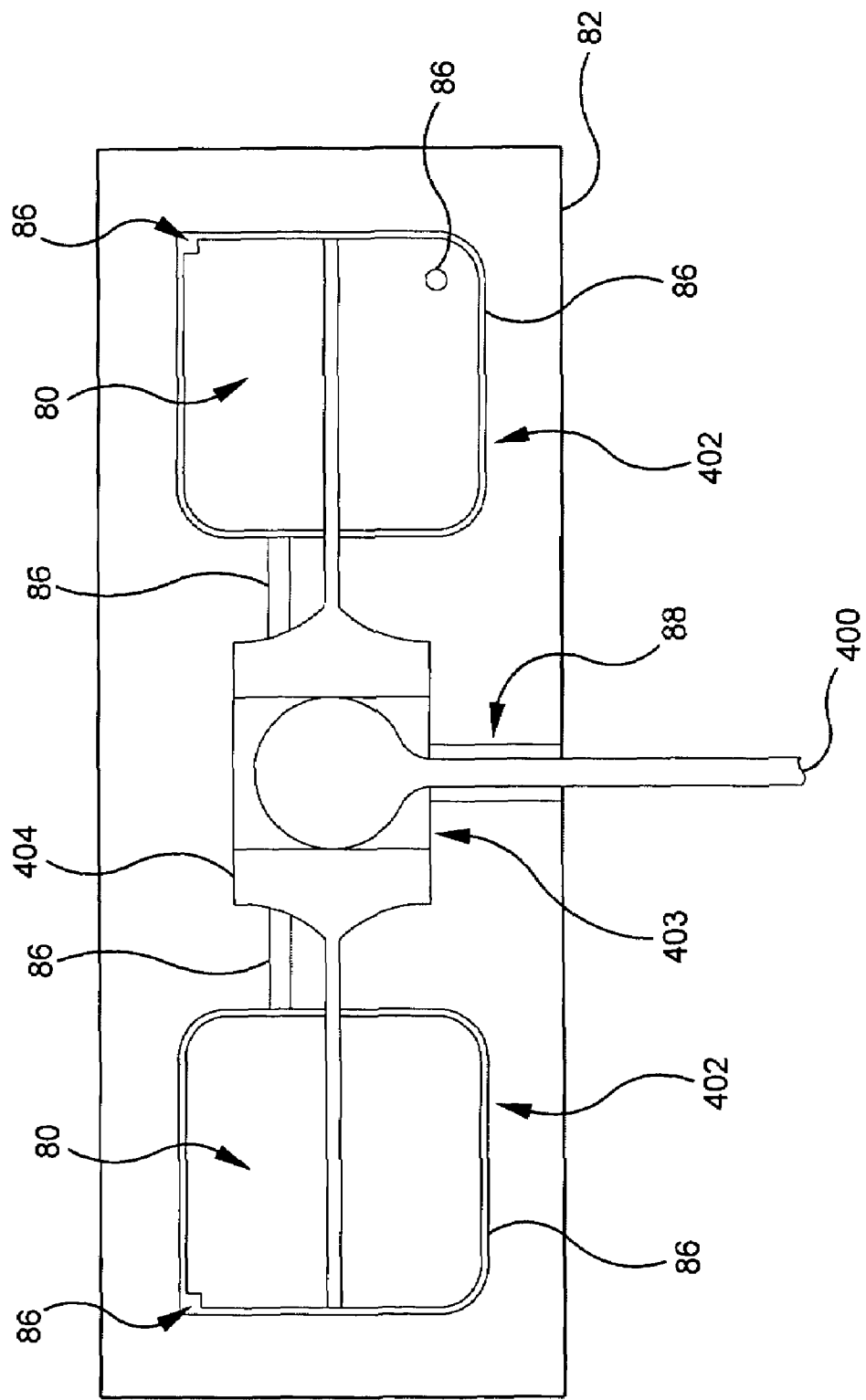

Reference will now be made in detail to the present preferred embodiments of the invention, examples of which are illustrated in the accompanying Drawings. The invention includes a fluid-elastomeric damper assembly with a reciprocating piston structure grounded to a first structure and driven by a second structure with the piston structure submerged in a fluid and having a first fluid filled chamber and a second fluid filled chamber which communicate via a pump restriction orifice through which the piston forces the fluid through. The invention includes fluid-elastomeric damper assembly 10 includes a first elastomer seal 12, such as a rubber seal or the like, disposed at a first end 14 of the fluid-elastomeric damper assembly 10 and a second elastomer seal 16, such as a rubber seal or the like, disposed at a second end 18 of the fluid-elastomeric damper assembly 10. The first elastomer seal 12 and the second elastomer seal 16 are fixedly attached or otherwise coupled to a first moving/vibrating structure 20, such as a flex-beam of the rotor of a rotary-wing aircraft or the like, and the first elastomer seal 12 and the second elastomer seal 16 are fixedly attached or otherwise coupled to a second moving/vibrating structure 22, such as a pitch case of the rotor of a rotary-wing aircraft or the like. The first elastomer seal 12 and the second elastomer seal 16 are both bonded, fixedly attached, or otherwise coupled to a housing structure 24 including, for example, a first housing member 26, a second housing member 28, and a third housing member 70. The first elastomer seal 12 and the second elastomer seal 16 are also both bonded, fixedly attached, or otherwise coupled to a substantially circular base plate 64. Together, the first elastomer seal 12, the second elastomer seal 16, the housing structure 24, and the substantially circular base plate 64 are operable for containing a fluid (not shown), such as hydraulic fluid or the like. An internal pumping mechanism 30 (described in greater detail herein below) is also disposed within the housing structure 24. The internal pumping mechanism 30 is grounded to the first moving/vibrating structure 20 and moves in relation to the housing structure 24 and the second moving/vibrating structure 22 to which the housing structure 24 is grounded. The internal pumping mechanism 30 is configured such that, when the internal pumping mechanism 30 moves with respect to the housing structure 24 and the second/moving vibrating structure 22, the fluid surrounding and disposed within the internal pumping mechanism 30 is pumped from at least a first chamber 32 disposed within the internal pumping mechanism 30 to at least a second chamber 34 disposed within the internal pumping mechanism 30 through a restriction, i.e., an orifice 86 (FIGS. 3, 14A, 18). Optionally, the relative size of the restriction is controlled by an adjustable pressure relief device 36 and/or a temperature-compensating device 38 (both described in greater detail herein below). It should be noted that FIG. 1 illustrates an upper fluid-elastomeric damper assembly 10 (top portion of FIG. 1) including an internal pumping mechanism 30 and a lower fluid-elastomeric damper assembly 10 (bottom portion of FIG. 1) without an internal pumping mechanism 30. The lower-fluid-elastomeric damper 10 assembly may, optionally, include an internal pumping mechanism 30.

Figure 11:
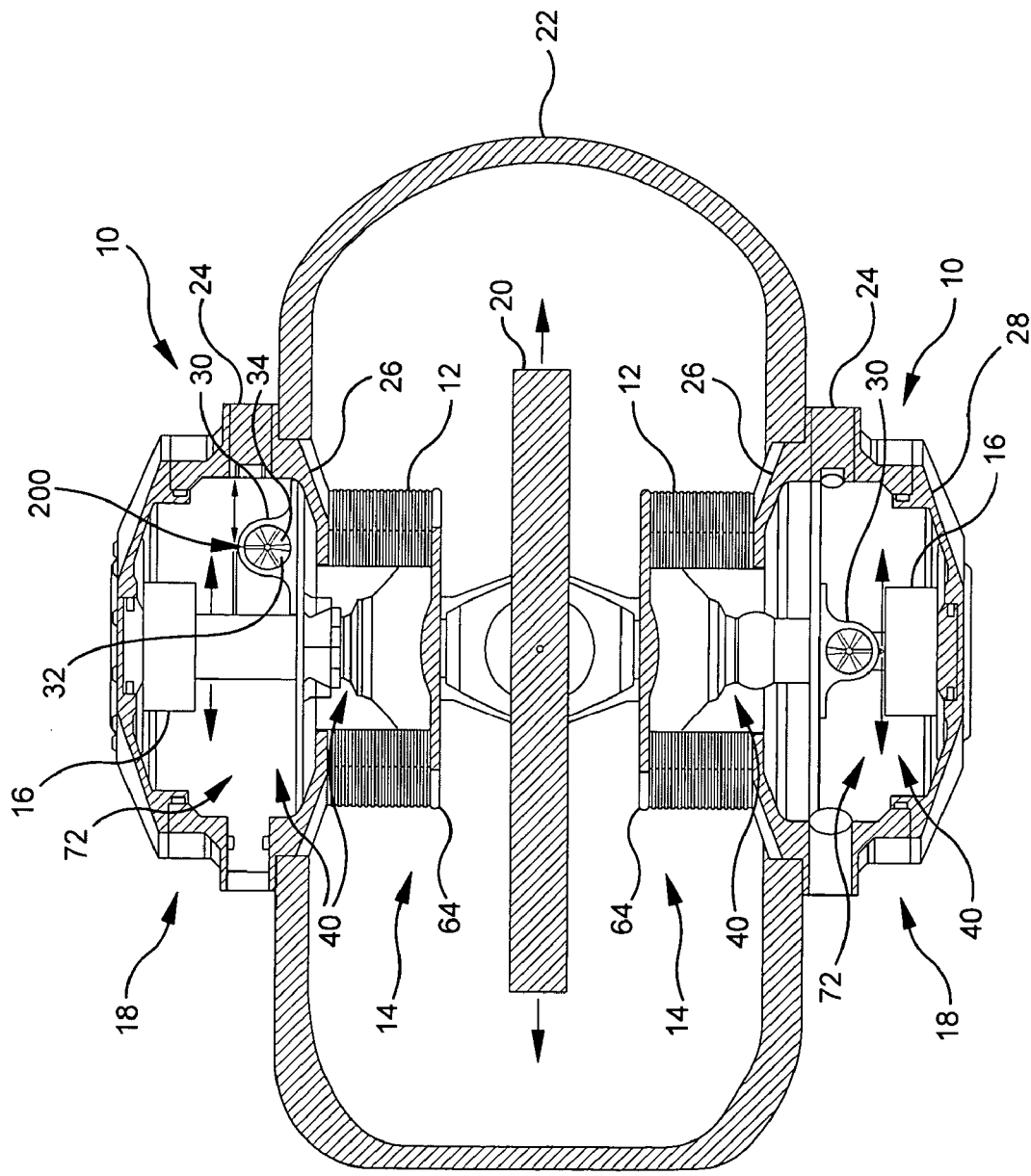
FIG. 11 shows an embodiment of the invention.
Figure 12:
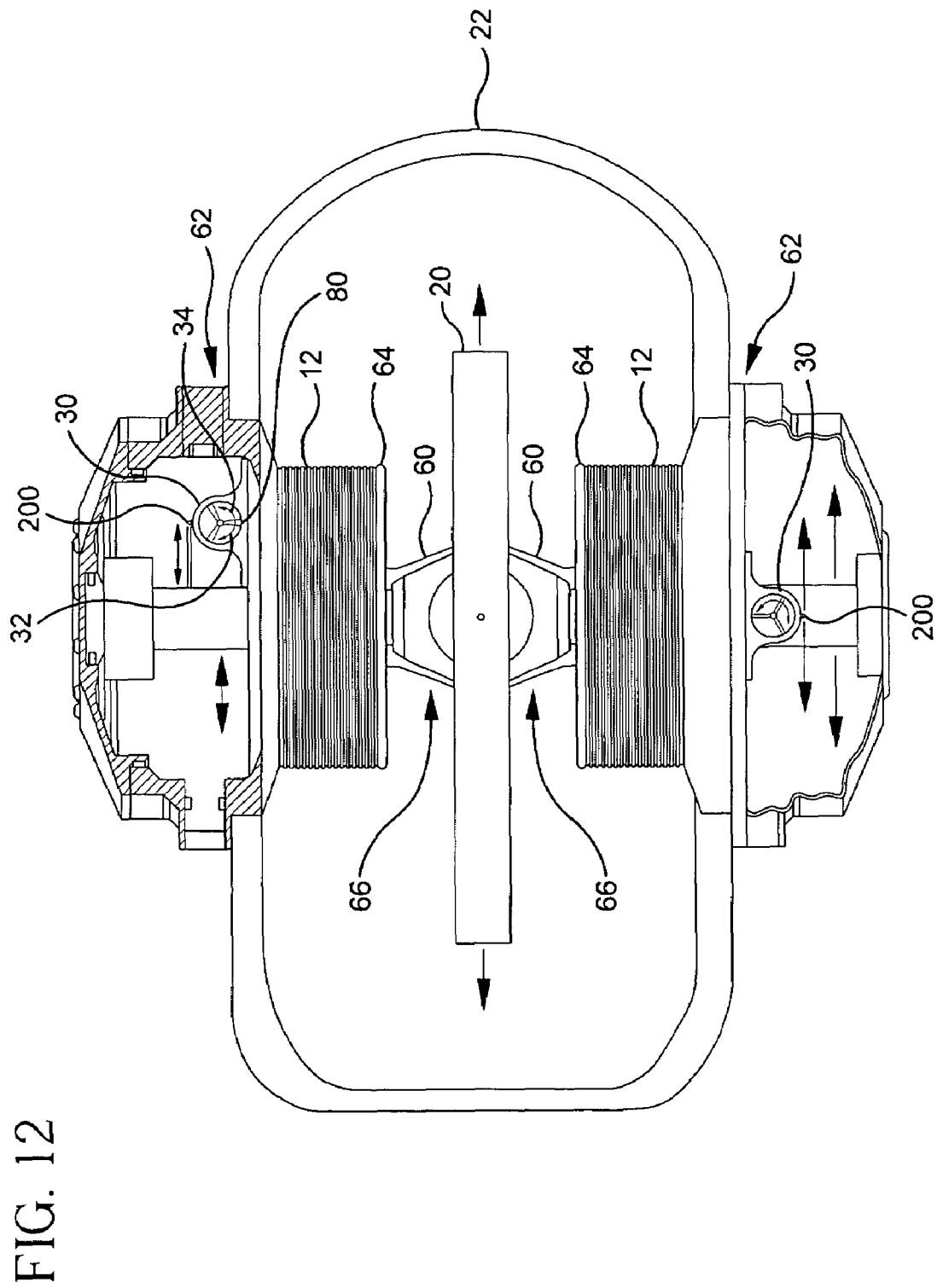
FIG. 12 shows an embodiment of the invention.
Figure 13:
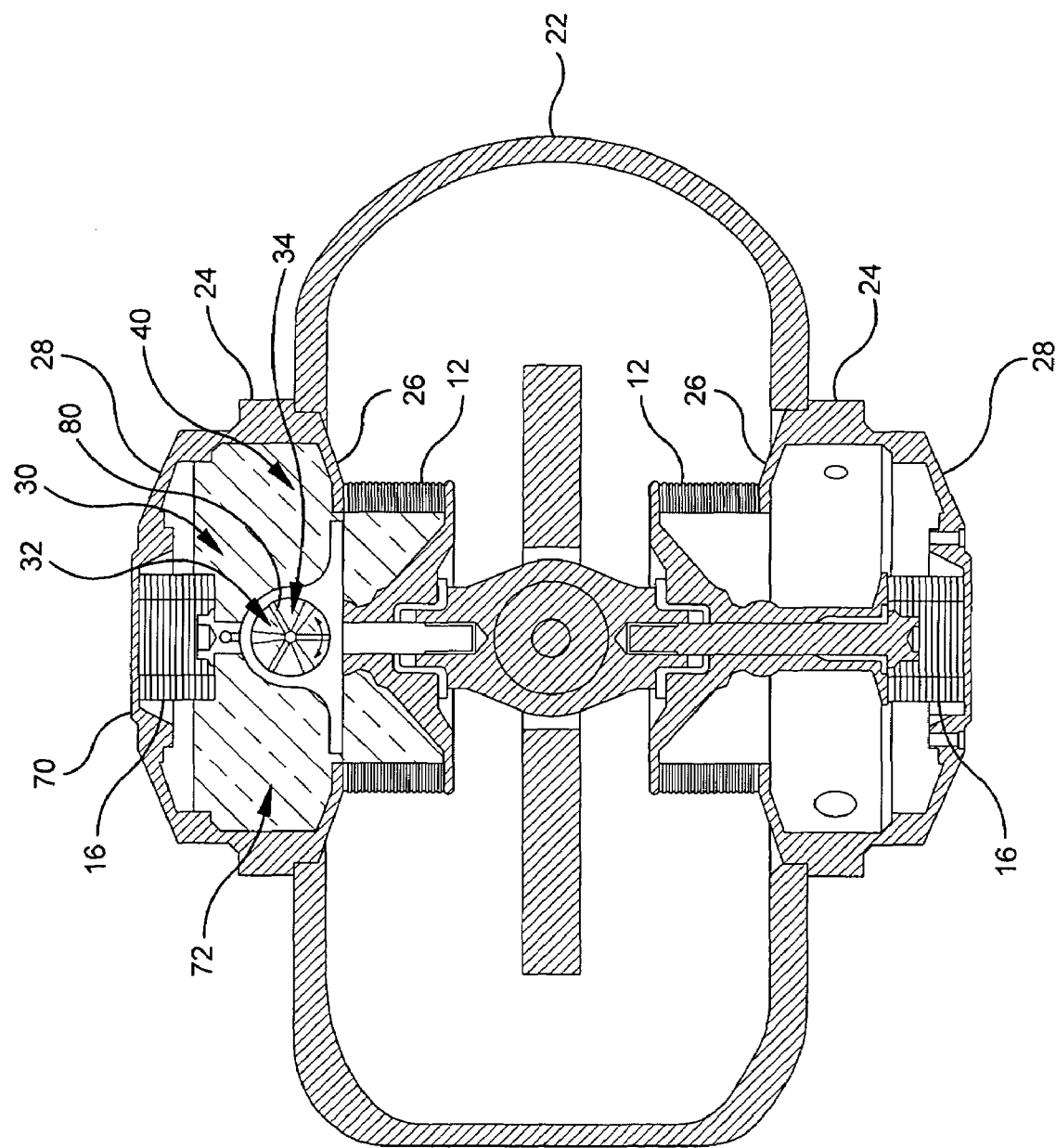
FIG. 13 shows an embodiment of the invention.

Advantageously, the first elastomer seal 12, the second elastomer seal 16, the housing structure 24, and the substantially circular base plate 64 provide a fluid-elastomeric chamber 40 operable for containing the fluid and in which the internal pumping mechanism 30 may be submerged. This fluid-elastomeric chamber 40 is flexible and allows the internal pumping mechanism 30 to damp movement/vibration in a primary direction with a relatively high damping force. Movement/vibration in a plurality of other directions are also accommodated by design, due to the coupling features of the internal pumping mechanism 30. It should be noted that two (2) fluid-elastomeric damper assemblies 10 are illustrated and used in combination such as in FIG. 1 (and in other drawings described herein below) in order to damp lead-lag movement/vibration in the rotor of a rotary-wing aircraft or the like. FIG. 1 illustrates an upper fluid-elastomeric damper assembly 10 (top portion of FIG. 1) including an internal pumping mechanism 30 and a lower fluid-elastomeric damper assembly 10 (bottom portion of FIG. 1) without an internal pumping mechanism 30. The lower-fluid-elastomeric damper 10 assembly may, optionally, include an internal pumping mechanism 30, for example as shown in FIG. 11.

Figure 2:
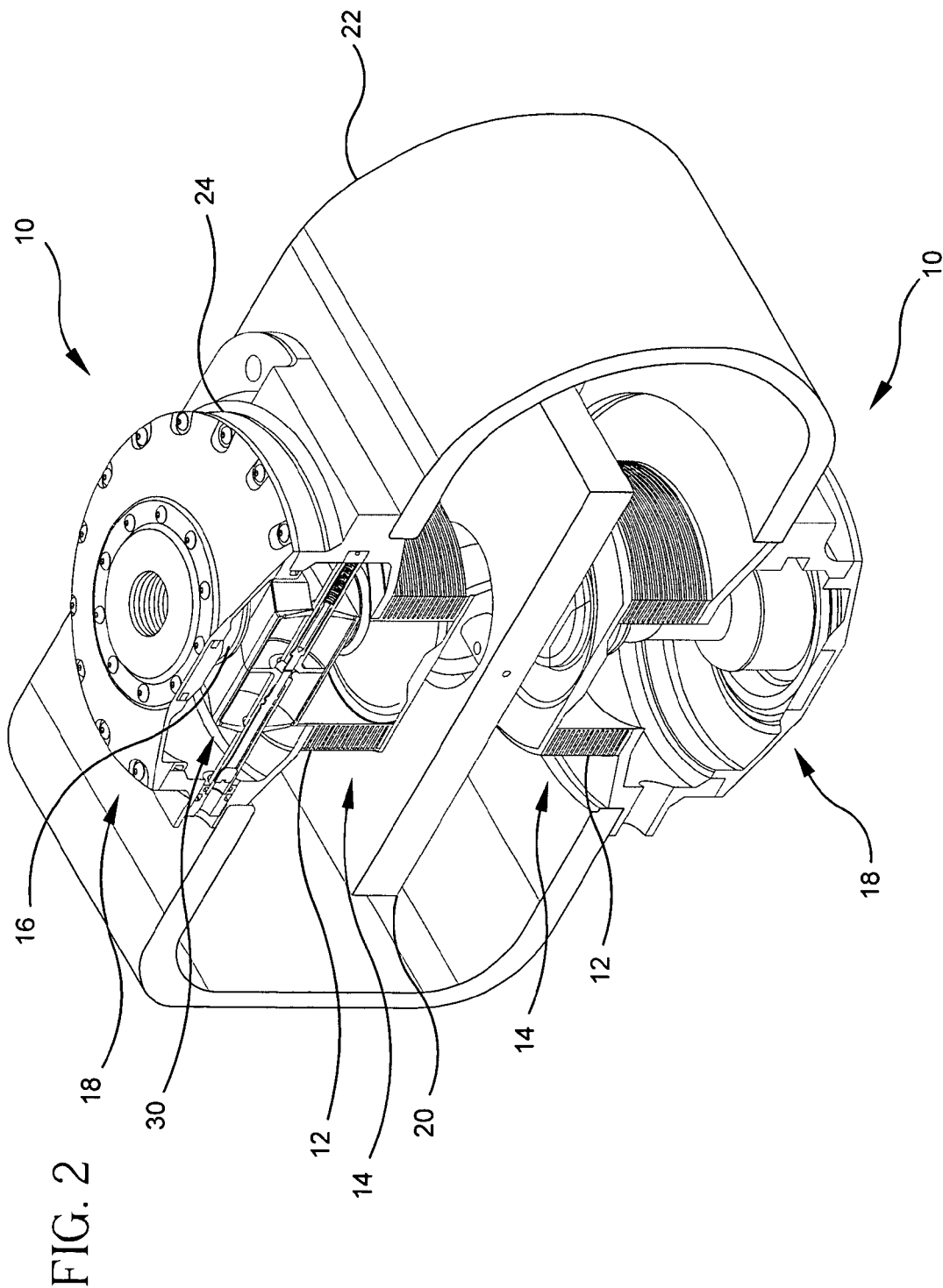
FIG. 2 is a perspective view of the fluid-elastomeric damper assembly of FIG. 1, again highlighting the internal pumping device disposed with the fluid-elastomeric chamber of the fluid-elastomeric damper assembly (the top portion of FIG. 2 illustrating the internal pumping device, the bottom portion of FIG. 2 illustrating the fluid-elastomeric chamber)

Referring to FIGS. 2 and 3, the first elastomer seal 12 disposed at the first end 14 of the fluid-elastomeric damper assembly 10 and the second elastomer seal 16 disposed at the second end 18 of the fluid-elastomeric damper assembly 10 may, optionally, include a plurality of metal or substantially rigid laminates (shims) 50 (FIG. 3) or the like disposed within a rubber seal 52 (FIG. 3) or the like. This configuration provides both the first elastomer seal 12 and the second elastomer seal 16 with strength/rigidity and flexibility/pliability. Both the first elastomer seal 12 and the second elastomer seal 16 may have a substantially cylindrical or conical shape, although other suitable shapes may be utilized. In an exemplary embodiment of the present invention, the diameter of the second elastomer seal 16 is between about one-third (⅓) and about three-quarters (¾) the diameter of the first elastomer seal 12. Other shapes and sizes may, however, be used as necessary.

Figure 5:
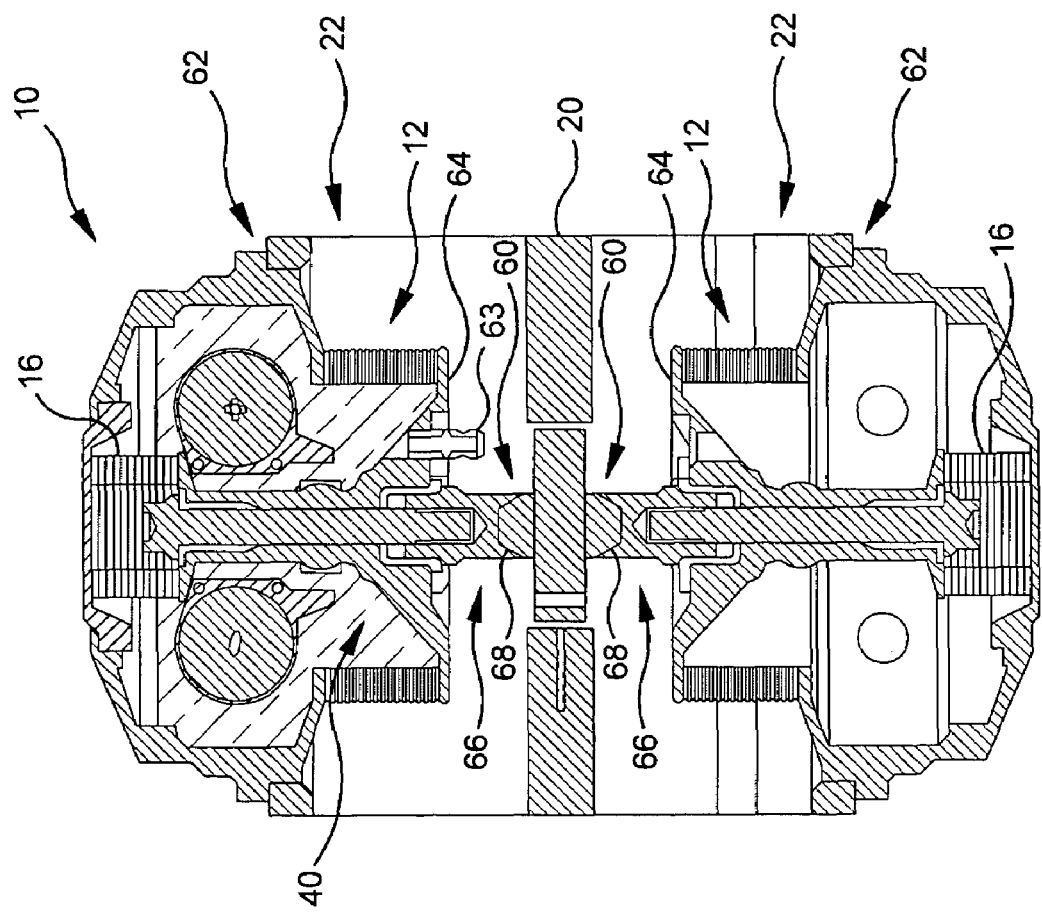
FIG. 5 is a cross-sectional front (beam-wise) view of the fluid-elastomeric damper assembly of FIGS. 1–4 (the top portion of FIG. 5 illustrating the internal pumping device, the bottom portion of FIG. 5 illustrating the fluid-elastomeric chamber)
Figure 6:
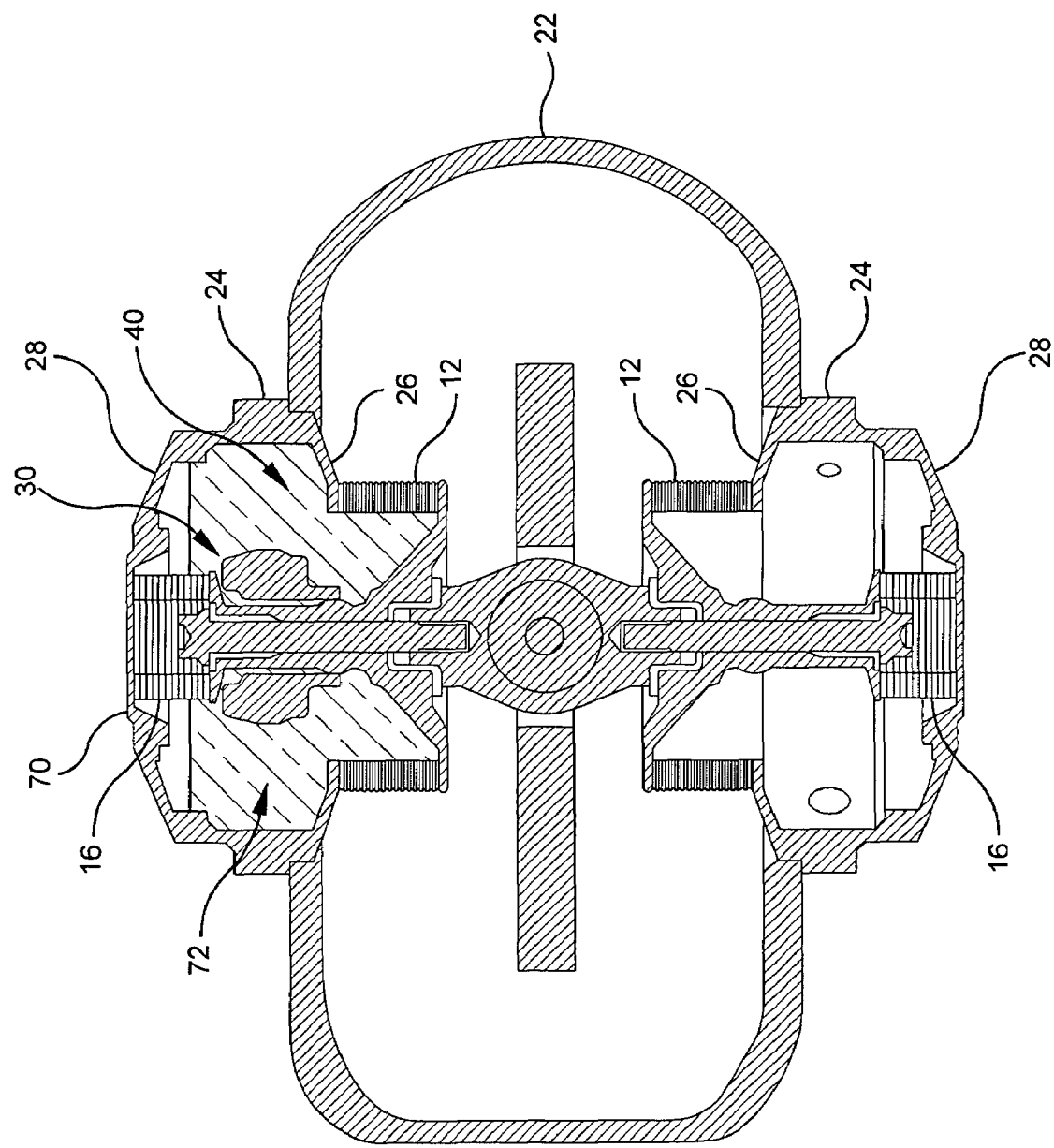
FIG. 6 is another cross-sectional side (cord-wise) view of the fluid-elastomeric damper assembly of FIGS. 1–5 (the top portion of FIG. 6 illustrating the internal pumping device, the bottom portion of FIG. 6 illustrating the fluid-elastomeric chamber)

The first elastomer seal 12 is fixedly attached or otherwise coupled to the first moving/vibrating structure 20, such as a flex-beam of the rotor of a rotary-wing aircraft or the like, via a first attachment mechanism 60. Likewise, the first elastomer seal 12 and the second elastomer seal 16 (FIG. 5) are fixedly attached or otherwise coupled to the second moving/vibrating structure 22, such as a pitch case of the rotor of a rotary-wing aircraft or the like, via a second attachment mechanism 62. The first attachment mechanism 60 may include, for example, the substantially circular base plate 64 bonded, fixedly attached, or otherwise coupled to the first elastomer seal 12 and the second elastomer seal 16. The base plate 64 is fixedly attached or otherwise coupled to one or more spanning members 66 that are, in turn, fixedly attached or otherwise coupled to a compliant member 68 (FIG. 5) associated with the first moving/vibrating structure 20. The base plate 64, the one or more spanning members 66, and the compliant member 68 may be made of, for example, a metal or any other substantially rigid material. Optionally, the base plate 64, the one or more spanning members 66, and/or the compliant member 68 may be integrally formed. Although an exemplary first attachment mechanism 60 has been described herein, any other first attachment mechanism 60 operable for fixedly attached or otherwise coupling the first elastomer seal 12 and the base plate 64 to the first moving/vibrating structure 20 may be used. As is described in greater detail herein below, the second attachment mechanism 62 fixedly attached or otherwise coupled to the second moving/vibrating structure 22 may, optionally, be integrally formed/coincident with the housing structure 24 (FIG. 1). Optionally, the fluid-elastomeric damper assembly 10 of the present invention further includes a gas charge/discharge valve 63 operable for introducing damping fluid and/or a gas, such as nitrogen or the like, into and/or removing damping fluid and/or a gas from the fluid-elastomeric chamber 40.

The first elastomer seal 12 and the second elastomer seal 16 are both bonded, fixedly attached, or otherwise coupled to the housing structure 24, which may be made of, for example, a metal or any other substantially rigid material. In an exemplary embodiment of the present invention, the housing structure 24 includes a first housing member 26 and a second housing member 28. The first housing member 26 may be a substantially cup-shaped structure. Accordingly, the second housing member 28 may be a substantially disc-shaped structure. Optionally, the housing structure 24 may also include a third, substantially disc-shaped housing member 70 that, together with the first housing member 26 and the second housing member 28, serves as the second attachment mechanism 62, fixedly attaching or otherwise coupling the first elastomer seal 12 and the second elastomer seal 16 to the second moving/vibrating structure 22. The first housing member 26, the second housing member 28, and the third housing member 70 may be bolted or otherwise attached together, or they may be integrally formed. Together, the first elastomer seal 12, the second elastomer seal 16, and the housing structure 24 are operable for containing the fluid 72, such as hydraulic fluid or the like, in the fluid-elastomeric chamber 40. The fluid-elastomeric chamber 40 partially formed by the first elastomer seal 12, the second elastomer seal 16, and the housing structure 24 may, optionally, have a plurality of circular diameters substantially conforming to the shape of the internal pumping mechanism 30 disposed therein.

The internal pumping mechanism 30 disposed within the housing structure 24 is grounded to the first moving/vibrating structure 20 and moves in relation to the housing structure 24, which is grounded to the second moving/vibrating structure 22. The internal pumping mechanism 30 includes one or more piston structures 80 disposed within a piston structure housing 82. Preferably, the one or more piston structures 80 include one or more substantially cylindrical, hollow structures. Optionally, the one or more piston structures 80 and the piston structure housing 82 are integrally formed. Preferably, the one or more piston structures 80 and the piston structure housing 82 are free to move along one or more axially-extending structures 84 (FIG. 3), such as hollow and/or solid rods or the like, integrally formed with the piston assembly. Preferably the piston structure housing 82 is grounded to the first moving/vibrating structure 20 by a stem piece (not shown) that may be integrally formed with the base plate 64 or, optionally, may include a plurality of components. The piston structure housing 82 may be constructed in multiple sections to allow grounding of the piston structure housing 82 to the stem piece of the base plate 64. The one or more piston structures include a first chamber 32 and a second chamber 34 separated by the piston assembly, with the first chamber 32 and the second chamber 34 in fluid communication through a pumping piston restriction, i.e., an orifice 86. The piston assembly extends through the piston structure housing 82 to the housing structure 24, to which it is grounded. A plurality of holes 88 are disposed within the walls of the one or more piston structures 80 and the piston structure housing 82, allowing the fluid 72 to flow from the fluid-elastomeric chamber 40 into the internal pumping mechanism 30. Additionally, clearance between the piston structure housing 82 and the piston assembly allow fluid to flow from the fluid-elastomeric chamber 40 into the internal pumping mechanism 30. The fluid transfer between the fluid-elastomeric chamber 40 and the internal pumping mechanism 30 is controlled by the clearance around the piston assembly. The orifices 86 represents the path of least resistance for the fluid 72. The internal pumping mechanism 30 is configured such that, when the one or more piston structures 80 and the piston structure housing 82 move with respect to the housing structure 24 and the second/moving vibrating structure 22, the fluid 72 surrounding and disposed within the one or more pistol structures is pumped from the first chamber 32 to the second chamber 34 by the movement of piston structures 80 with the fluid 72 pumped back and forth between the first and second chambers through the orifice 86. As shown in FIGS. 1–3, the relative linear motion between the first moving structure 20 and the second moving structure 22 drives the linear reciprocating motion of the internal pumping mechanism 30, and forces the flow of fluid 72 through the orifice 86 between the first chamber 32 and the second chamber 34. As shown in FIGS. 11–14, the relative linear motion between the first moving structure 20 and the second moving structure 22 drives the rotational reciprocating motion of the internal pumping mechanism 30 with the rotation of the rotational plate piston 80 forcing the flow of fluid 72 through the orifices 86 between the first chambers 32 and the second chambers 34. Preferably a sliding actuating pin decoupler ball linear to rotational linkage 200 and a linear to rotational load transfer disk 300 couples the reciprocating linear motion into the reciprocating rotational motion that drives the rotational plate piston 80 in its piston channel and forces the pumping flow of fluid 72 through orifices 86. As shown the pumping piston restriction orifice 86 can be in the rotational plate piston 80, in the stationary plate housing 82, and/or the clearance between the rotational plate piston 80 and the housing 82. Preferably the actuating pin translates the linear motion relative to the supporting structure into the rotational motion of rotational plates radial pistons 80 which pumps fluid 72 through restrictions 86 between the chambers. This fluid restriction 86 creates fluid damping forces. The reciprocating rotating radial piston structures 80 reduce the dynamic stiffness of the overall system by minimizing dynamic fluid forces on the elastomer portions of the damping device allowing for greater amounts of damping to be generated over devices which rely on elastomeric interfaces to force fluid motion. The rotational nature of the pistons allow for damping to be generated through large amplitude linear motions of the support structure where linear motion pistons may be troublesome. As shown in FIGS. 15–18, the relative linear motion between the first moving structure 20 and the second moving structure 22 drives the linear reciprocating motion of the internal pumping mechanism 30 with the linear parallel motion of the twin plate pistons 80 in the parallel piston slide channels 402 forcing the flow of fluid 72 through the orifices 86 between the first chambers 32 and the second chambers 34. Preferably a sliding actuating pin decoupler ball linear linkage 400 couples the reciprocating linear motion into the reciprocating linear motion of center piston slider 404 in piston slider center channel 403 and twin plate pistons 80 in parallel piston slide channels 402 and forces the pumping flow of the fluid through orifices 86. As shown the pumping piston restriction orifice 86 can be in the plate piston 80, the clearance between the edge of plate piston 80 and the walls of the parallel piston slide channels 402, and/or in the housing 82 such as orifices 86 through the housing walls separating piston slide channels 402 and piston slider center channels 403. The linear motion of plate pistons 80 in parallel piston slide channels 402 pumps fluid 72 through restrictions 86 between the chambers 32 and 34. As shown in FIGS. 15–18 preferably the internal pumping mechanism 30 includes a pair of linearly reciprocating plate pistons 80 that linearly reciprocate in a pair of parallel piston slide channels 402, driven by a piston slider 404 that linearly reciprocates in a piston slider center channel 403. In a preferred embodiment the internal pumping mechanism 30 includes a reciprocating plate piston 80 in a piston channel, most preferably a linearly reciprocating plate piston 80 in a piston slide channel 402.

The invention includes a fluid-elastomeric damper assembly 10 operable for damping a relative motion between a first structure 22 and a second structure 20, the fluid-elastomeric damper assembly 10 comprising: a plurality of elastomer seals 12, 16 coupled to the housing 24 of the first structure 22, wherein the first structure housing 24 and the plurality of elastomer seals define a fluid-elastomeric chamber 40 operable for containing a fluid 72; an internal pumping mechanism 30 with at least one fluid moving piston 80 disposed within the first structure housing 24 and the fluid-elastomeric chamber 40, wherein the internal pumping mechanism 30 is grounded to the first structure and driven by the second structure, and wherein the at least one piston 80 forces said fluid 72 through at least one orifice 86 between a first substantially fluid-filled chamber 32 and a second substantially-fluid-filled chamber 34 which are in fluid communication with the fluid-elastomeric chamber 40; and wherein said relative motion between said first structure 22 and said second structure 20 is operable for pumping the fluid 72 through said at least one orifice 86. In a preferred embodiment the at least one fluid moving piston 80 is a linearly reciprocating piston structure that pumps said fluid with a linear motion. In an alternative preferred embodiment the at least one fluid moving piston 80 is a rotational plate and pumps said fluid with a rotational motion.

The invention includes a method for damping a relative motion between a first structure 22 and a second structure 20. The method comprises grounding a housing 24 to the first structure 22; coupling a plurality of elastomeric seals 12,16 to the housing, wherein the housing 24 and the plurality of elastomeric seals 12,16 provide a fluid-elastomeric chamber 40 for containing a fluid 72; disposing a fluid 72 within the fluid-elastomeric chamber 40; disposing an internal fluid pump 30 with at least one fluid moving piston 80 within the housing and the fluid-elastomeric chamber and grounding the internal fluid pump 30 to the first structure, wherein the internal fluid pump 30 comprises a first substantially fluid-filled chamber 32 and a second substantially fluid-filled chamber 34 in communication via at least one orifice 86, said first substantially fluid-filled chamber 32 and said second substantially fluid-filled chamber 34 in communication with the fluid-elastomeric chamber 40; wherein said relative motion between said first structure 22 and said second structure 20 drives said at least one fluid moving piston 80 to pump said fluid 72 through said at least one orifice 86. In a preferred embodiment the at least one fluid moving piston 80 is a linearly reciprocating piston and pumps said fluid 72 through said at least one orifice 86 with a linear motion. In an alternative preferred embodiment said at least one fluid moving piston 80 is a rotational reciprocating piston and pumps said fluid 72 through said at least one orifice 86 with a rotational motion.

The invention includes a method of making a rotary-wing aircraft fluid-elastomeric damper assembly 10 for damping a relative motion between a first rotary-wing aircraft structure 22 and a second rotary-wing aircraft structure 20 in a rotary-wing aircraft. The method includes coupling a plurality of elastomeric seals 12, 16 to a housing 24, wherein the housing 24 and the plurality of elastomeric seals 12, 16 provide a fluid-elastomeric chamber 40 for containing a fluid 72; disposing an internal fluid pump 30 with at least one fluid moving piston 80 within the housing 24 and the fluid-elastomeric chamber 40 and grounding the internal fluid pump 30 to the first structure, disposing a fluid 72 within the fluid-elastomeric chamber 40 wherein the internal fluid pump 30 comprises a first substantially fluid-filled chamber 32 and a second substantially fluid-filled chamber 34 in communication via at least one orifice 86, said first substantially fluid-filled chamber 32 and said second substantially fluid-filled chamber 34 in communication with the fluid-elastomeric chamber 40; wherein said relative motion between said first structure 22 and said second structure 20 drives said at least one fluid moving piston 80 to pump said fluid 72 through said at least one orifice 86. In a preferred embodiment said at least one fluid moving piston 80 is a linearly reciprocating piston that pumps said fluid 72 through said at least one orifice 86 with a linear motion. In an alternative preferred embodiment said at least one fluid moving piston 80 is a rotational reciprocating piston that pumps said fluid 72 through said at least one orifice 86 with a rotational motion. In a preferred embodiment the fluid moving piston 80 is a reciprocating plate piston in a piston channel, most preferably a pair of linearly reciprocating plate pistons 80 in a pair of parallel piston slide channels 402.

Thus, the first elastomer seal 12, the second elastomer seal 16, the housing structure 24, and the base plate 64 provide a fluid-elastomeric chamber 40 operable for containing the fluid 72 and in which the internal pumping mechanism 30 may be submerged. This fluid-elastomeric chamber 40 is flexible and allows the internal pumping mechanism 30 to damp movement/vibration in a primary direction with a relatively high damping force.

Figure 7:
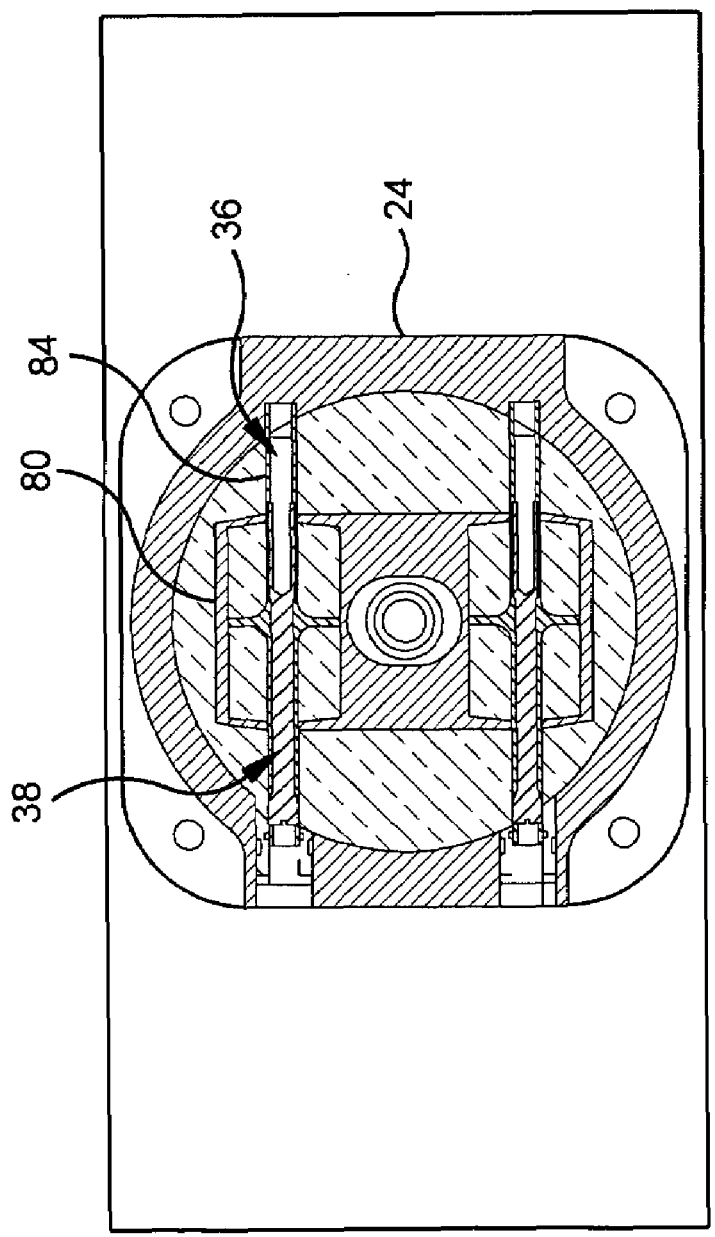
FIG. 7 is a cross-sectional top view of the fluid-elastomeric damper assembly of FIGS. 1–6, again highlighting the internal pumping device disposed with the fluid-elastomeric chamber of the fluid-elastomeric damper assembly.

Referring to FIG. 7, as described above, an adjustable pressure relief device 36 and/or a temperature-compensating device 38 may be disposed within the one or more hollow axially-extending structures 84 (i.e., the piston assembly) that carry the one or more piston structures 80. The adjustable pressure relief device 36 includes a spring-loaded member 90 (FIG. 3) that partially protrudes into the orifice 86 (FIG. 3), selectively blocking a portion thereof and restricting the flow of fluid therethrough. The spring-loaded member 90 of the adjustable pressure relief device 36 is displaced in the presence of relatively high fluid pressure. The amount of force required to displace the spring-loaded member 90 of the adjustable pressure relief device 36 may be adjusted via an adjustment mechanism 92 (FIG. 3) disposed within the housing structure 24. Additionally, the spring-side of the hollow structure communicates with the fluid-elastomeric chamber 40 via one or more holes 93 (FIG. 3) disposed within and through the walls of the hollow portion of the piston assembly 84. These communication holes 93 allow a pressure differential to occur between the relatively high dynamic pressure at the orifice 86 and the steady ambient pressure of the fluid-elastomeric chamber 40, actuating the adjustable pressure relief device 36. The temperature-compensating device 38 includes a temperature-sensitive member 94 (FIG. 3) that partially protrudes into the orifice 86, selectively blocking a portion thereof and restricting the flow of fluid therethrough. Preferably, the temperature sensitive member has a predetermined thermal expansion coefficient such that the degree of flow restriction may be varied for a given change in temperature. The pressure relief device 36 and the temperature-compensating device 38 work together to provide a predetermined degree of damping. The grounding of the piston assembly to the housing structure 24 is accomplished by means of one or more retaining structures. The one or more retaining structures may be solid and/or hollow and allow for the adjustment of the internal mechanisms of the fluid-elastomeric damper assembly 10. Preferably, the one or more retaining structures form an integral seal with the piston assembly and the housing structure 24. The one or more retaining structures may allow access to either or both, if multiple retaining structures disposed adjacent to the appropriate mechanisms are used, the adjustable pressure relief device 36 and/or the temperature-compensating device 38.

Figure 8:
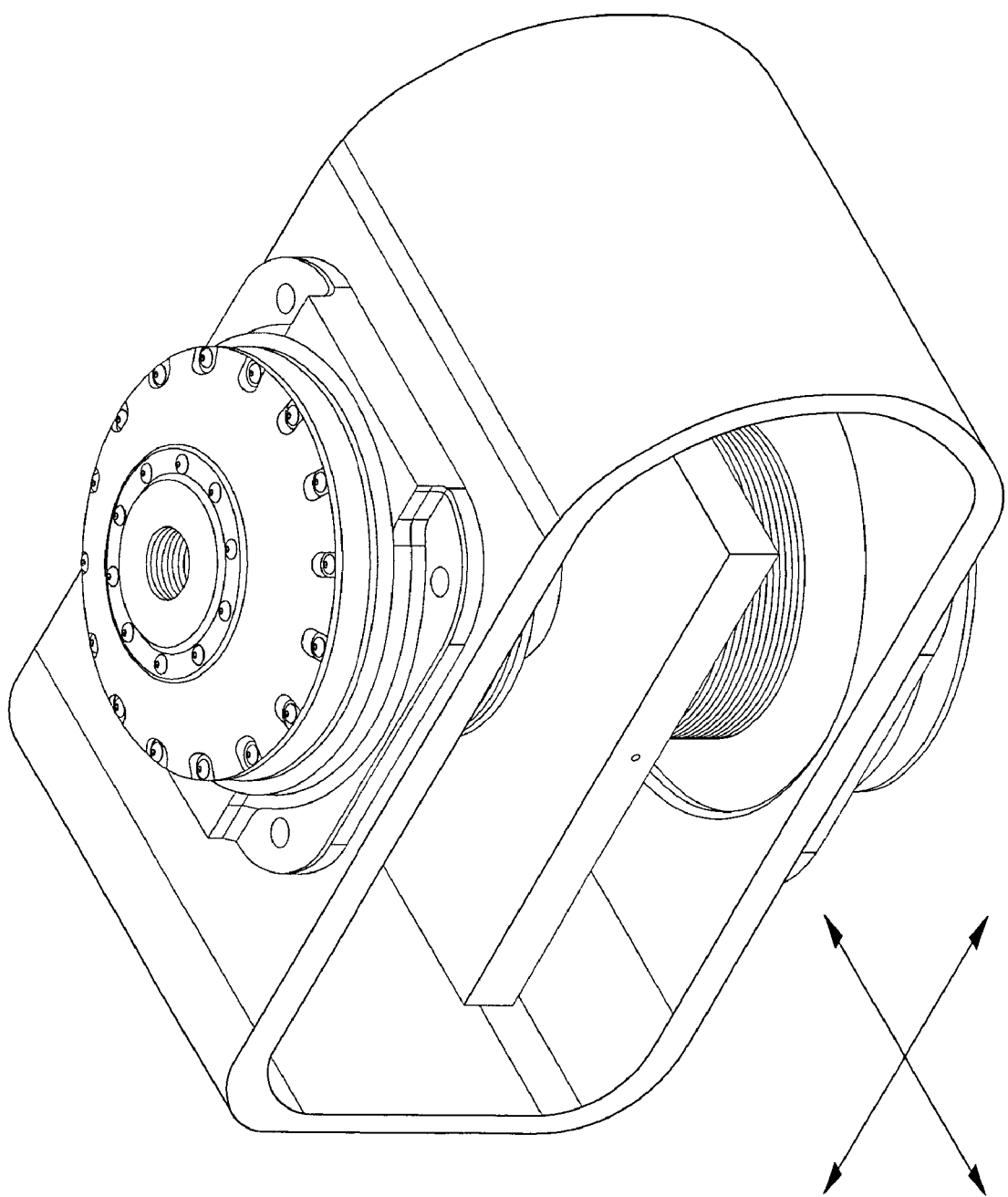
FIG. 8 is another perspective view of the fluid-elastomeric damper assembly of FIGS. 1–7.
Figure 9:
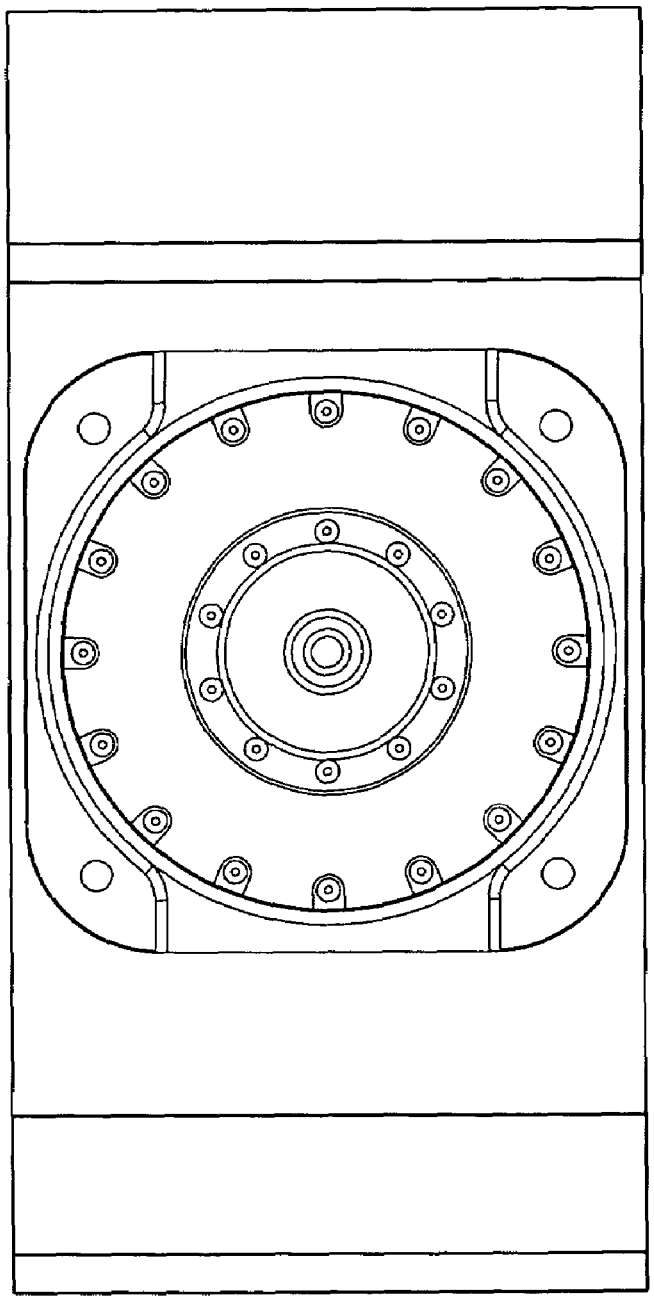
FIG. 9 is a top view of the fluid-elastomeric damper assembly of FIGS. 1–8.
Figure 10:
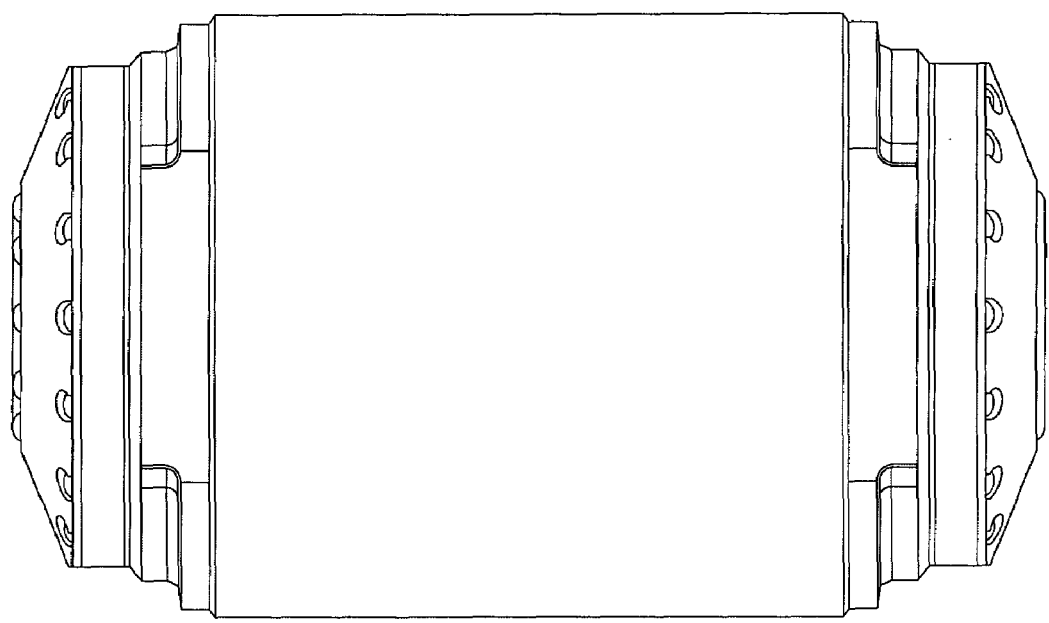
FIG. 10 is a front (beam-wise) view of the fluid-elastomeric damper assembly of FIGS. 1–9.

FIGS. 8, 9, and 10 provide several other views of the fluid-elastomeric damper assembly of the present invention, for use in conjunction with a typical flex-beam helicopter rotor assembly.

It is apparent that there has been provided, in accordance with the assemblies, mechanisms, and methods of the present invention, a fluid-elastomeric damper assembly including an internal pumping mechanism. Although the assemblies, mechanisms, and methods of the present invention have been described with reference to preferred embodiments and examples thereof, other embodiments and examples may perform similar functions and/or achieve similar results. All such equivalent embodiments and examples are within the spirit and scope of the present invention and are intended to be covered by the following claims.

What is claimed is:

1. A fluid-elastomeric damper assembly operable for damping a relative motion between a first structure and a second structure, the fluid-elastomeric damper assembly comprising: a plurality of elastomer seals coupled to the first structure, wherein the first structure and the plurality of elastomer seals define an external fluid-elastomeric chamber operable for containing a fluid; an internal pumping mechanism, said internal pumping mechanism including a first substantially fluid-filled internal pumping chamber, a second substantially fluid-filled internal pumping chamber, at least one internal pumping orifice between said first substantially fluid-filled internal pumping chamber and said second substantially fluid-filled internal pumping chamber and at least one fluid moving internal pumping piston, said least one fluid moving internal pumping piston for forcing said fluid through said at least one internal pumping orifice, said internal pumping mechanism disposed within said external fluid-elastomeric chamber distal from said elastomer seals with said first substantially fluid-filled internal pumping chamber, said second substantially fluid-filled internal pumping chamber, and said at least one internal pumping orifice separated from said external fluid-elastomeric chamber, with said first substantially fluid-filled internal pumping chamber and said second substantially fluid-filled internal pumping chamber in fluid communication with said external fluid-elastomeric chamber, wherein the internal pumping mechanism is grounded to the first structure and driven by the second structure, and wherein the at least one fluid moving internal pumping piston forces said fluid through said at least one internal pumping orifice between said first substantially fluid-filled internal pumping chamber and said second substantially fluid-filled internal pumping chamber; and wherein said relative motion between said first structure and said second structure is operable for pumping the fluid through said at least one internal pumping orifice.

2. The fluid-elastomeric damper assembly of claim 1, wherein the at least one fluid moving piston is a linearly reciprocating piston structure.

3. The fluid-elastomeric damper assembly of claim 1, wherein the at least one fluid moving piston is a rotational plate.

4. The fluid-elastomeric damper assembly of claim 1, wherein the at least one fluid moving piston pumps said fluid with a linear motion.

5. The fluid-elastomeric damper assembly of claim 1, wherein the at least one fluid moving piston pumps said fluid with a rotational motion.

6. The fluid-elastomeric damper assembly of claim 1, wherein the internal pumping mechanism includes a pair of linearly reciprocating plate pistons in a pair of parallel piston slide channels.

7. The fluid-elastomeric damper assembly of claim 1, wherein the internal pumping mechanism includes a linearly reciprocating plate piston in a piston slide channel.

8. A method for damping a relative motion between a first structure and a second structure, the method comprising: grounding a housing to the first structure; coupling a plurality of elastomeric seals to the housing, wherein the housing and the plurality of elastomeric seals provide a fluid-elastomeric chamber for containing a fluid; disposing a fluid within the fluid-elastomeric chamber; disposing an internal fluid pump with at least one fluid moving piston within the fluid-elastomeric chamber and grounding the internal fluid pump to the first structure, wherein the internal fluid pump comprises a first substantially fluid-filled internal fluid pump chamber and a second substantially fluid-filled internal fluid pump chamber in communication via at least one internal fluid pump orifice, said first substantially fluid-filled internal fluid pump chamber and said second substantially fluid-filled internal fluid pump chamber separated from said fluid-elastomeric chamber, with said first substantially fluid-filled internal fluid pump chamber and said second substantially fluid-filled internal fluid pump chamber distal from said elastomeric seals and in communication with the fluid-elastomeric chamber; wherein said relative motion between said first structure and said second structure drives said at least one fluid moving piston to pump said fluid through said at least one internal fluid pump orifice.

9. A method as claimed in claim 8 wherein said at least one fluid moving piston is a linearly reciprocating piston.

10. A method as claimed in claim 8 wherein said at least one fluid moving piston is a rotational reciprocating piston.

11. A method as claimed in claim 8 wherein said at least one fluid moving piston pumps said fluid through said at least one orifice with a linear motion.

12. A method as claimed in claim 8 wherein said at least one fluid moving piston pumps said fluid through said at least one orifice with a rotational motion.

13. A method of making a rotary-wing aircraft fluid-elastomeric damper assembly for damping a relative motion between a first structure and a second structure in a rotary-wing aircraft, the method comprising: coupling a plurality of elastomeric seals to a housing, wherein the housing and the plurality of elastomeric seals provide a fluid-elastomeric chamber for containing a fluid; disposing an internal fluid pump with, a first internal fluid pump chamber and a second internal fluid pump chamber in communication via at least one internal fluid pump orifice and at least one fluid moving internal fluid pump piston within the fluid-elastomeric chamber and grounding the internal fluid pump to the first structure with said internal fluid pump distal from said elastomeric seals and said first internal fluid pump chamber, said second internal fluid pump chamber, said at least one internal fluid pump orifice and said at least one fluid moving internal fluid pump piston separated from said fluid-elastomeric chamber, disposing a fluid within the fluid-elastomeric chamber wherein said separated first internal fluid pump chamber and said second internal fluid pump chamber, are in communication with the fluid-elastomeric chamber; wherein said relative motion between said first structure and said second structure drives said at least one fluid moving internal fluid pump piston to pump said fluid through said at least one internal fluid pump orifice.

14. A method as claimed in claim 13 wherein said at least one fluid moving piston is a linearly reciprocating piston.

15. A method as claimed in claim 13 wherein said at least one fluid moving piston is a rotational reciprocating piston.

16. A method as claimed in claim 13 wherein said at least one fluid moving piston pumps said fluid through said at least one orifice with a linear motion.

17. A method as claimed in claim 13 wherein said at least one fluid moving piston pumps said fluid through said at least one orifice with a rotational motion.

18. A method as claimed in claim 13 wherein said at least one fluid moving piston includes a reciprocating plate piston in a piston channel.

19. A method as claimed in claim 13 wherein the internal fluid pump includes a pair of linearly reciprocating plate pistons in a pair of parallel piston slide channels.

* * * * *